(12) United States Patent
Hara et al.

(10) Patent No.: US 6,984,362 B2
(45) Date of Patent: Jan. 10, 2006

(54) PROCESSING APPARATUS, MEASURING APPARATUS, AND DEVICE MANUFACTURING METHOD

(75) Inventors: Shinichi Hara, Kitasaitama-gun (JP); Yutaka Tanaka, Utsunomiya (JP); Shigeru Terashima, Utsunomiya (JP); Takayuki Hasegawa, Utsunomiya (JP); Shin Matsui, Urawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 10/619,506

(22) Filed: Jul. 16, 2003

(65) Prior Publication Data

US 2004/0022694 A1    Feb. 5, 2004

Related U.S. Application Data

(62) Division of application No. 09/257,258, filed on Feb. 25, 1999, now Pat. No. 6,616,898.

(30) Foreign Application Priority Data

| Feb. 25, 1998 | (JP) | 10-060591 |
| Feb. 25, 1998 | (JP) | 10-060708 |
| Feb. 25, 1998 | (JP) | 10-060723 |
| Jan. 25, 1999 | (JP) | 11-015102 |

(51) Int. Cl.
*G05B 1/00* (2006.01)
*G05B 23/00* (2006.01)

(52) U.S. Cl. .............. 422/105; 422/109; 422/110; 422/112; 118/715; 118/723; 118/19

(58) Field of Classification Search ............ 422/112, 422/105, 109, 110; 118/715, 723, 19
See application file for complete search history.

(56) References Cited

U.S. PATENT DOCUMENTS

| 4,805,556 A | 2/1989 | Hagan et al. ............ 118/725 |
| 5,267,292 A | 11/1993 | Tanaka et al. .............. 378/34 |
| 5,871,587 A | 2/1999 | Hasegawa et al. ........ 118/719 |

FOREIGN PATENT DOCUMENTS

| DE | 39 40 405 A1 | 6/1990 |
| JP | 2-156625 | 6/1990 |
| JP | 8-264404 | 10/1996 |

Primary Examiner—Glenn Caldarola
Assistant Examiner—Alexis Wachtel
(74) Attorney, Agent, or Firm—Fitzpatrick, Cella, Harper & Scinto

(57) ABSTRACT

A processing apparatus includes a sealed vacuum chamber which contains a processing portion; a pressure controlling system which keeps the internal pressure of the sealed vacuum chamber constant at a predetermined level by exhausting the ambient gas in the sealed vacuum chamber; and an ambient gas recirculating system which recirculates the ambient gas exhausted from the sealed vacuum chamber back into the sealed vacuum chamber; wherein the ambient as recirculated by the ambient gas recirculating system is blown into the sealed vacuum chamber so that a gas flow is generated in a predetermined direction along the processing portion.

5 Claims, 13 Drawing Sheets

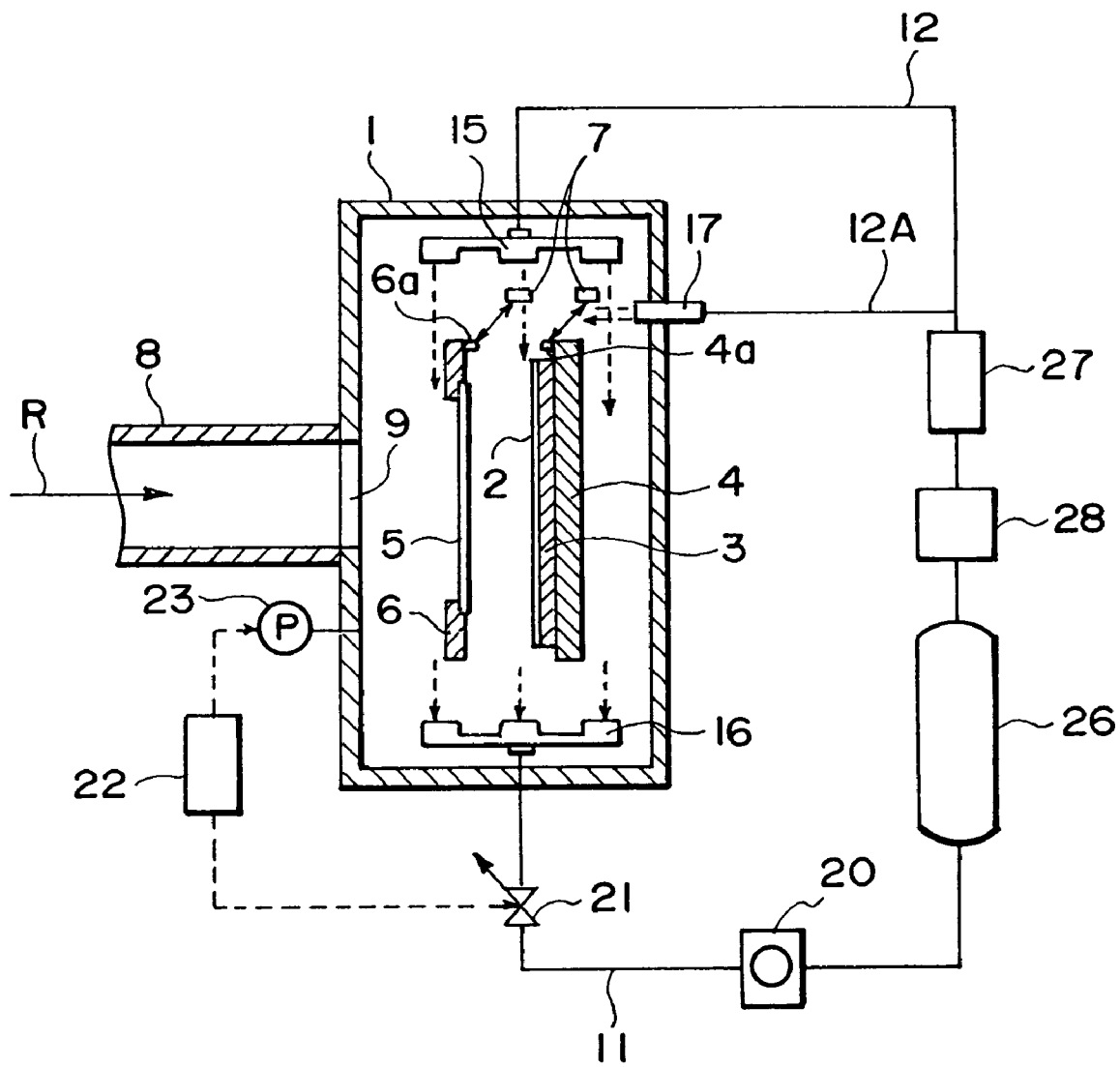
F I G. 1

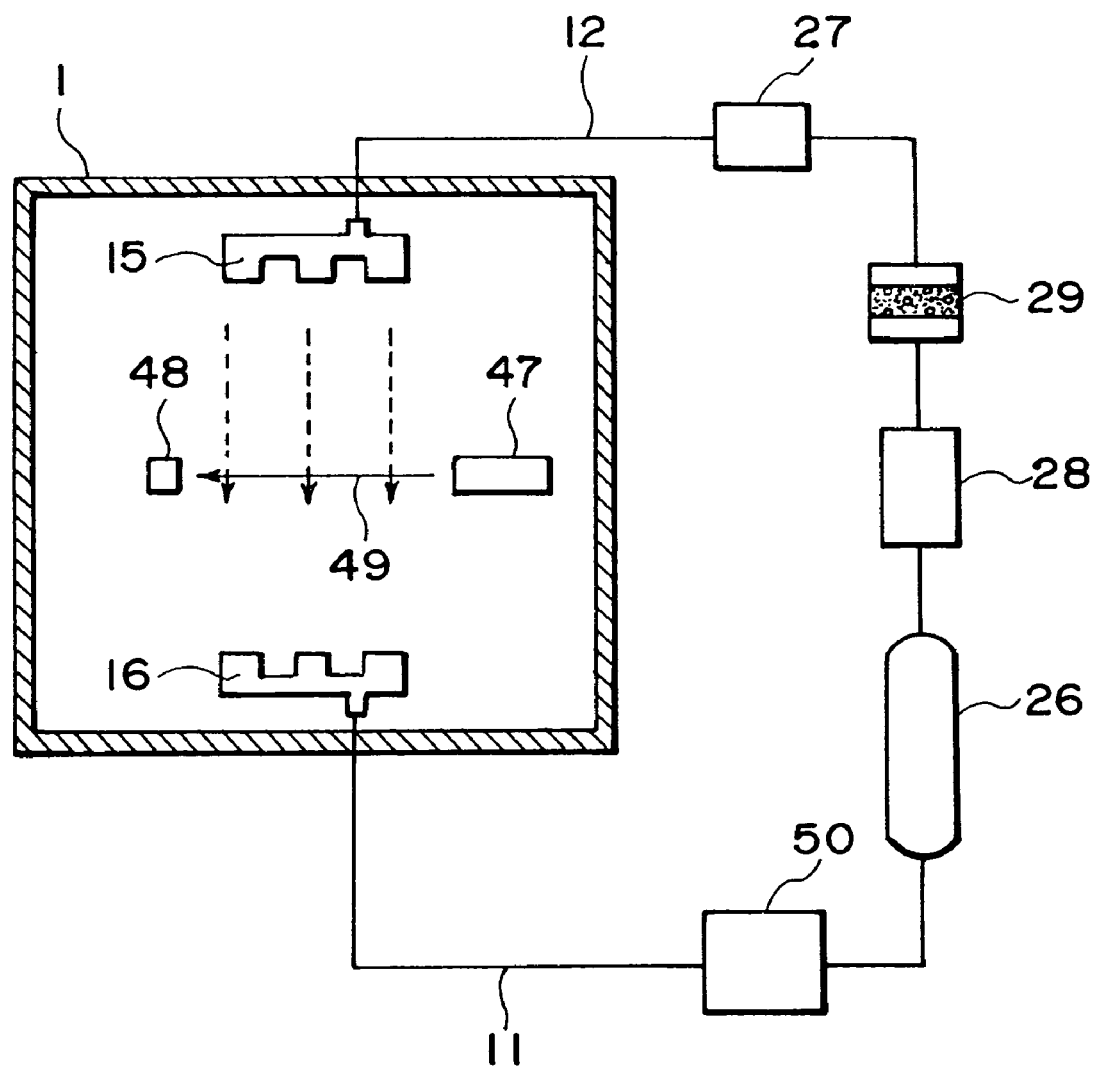
F I G. 3

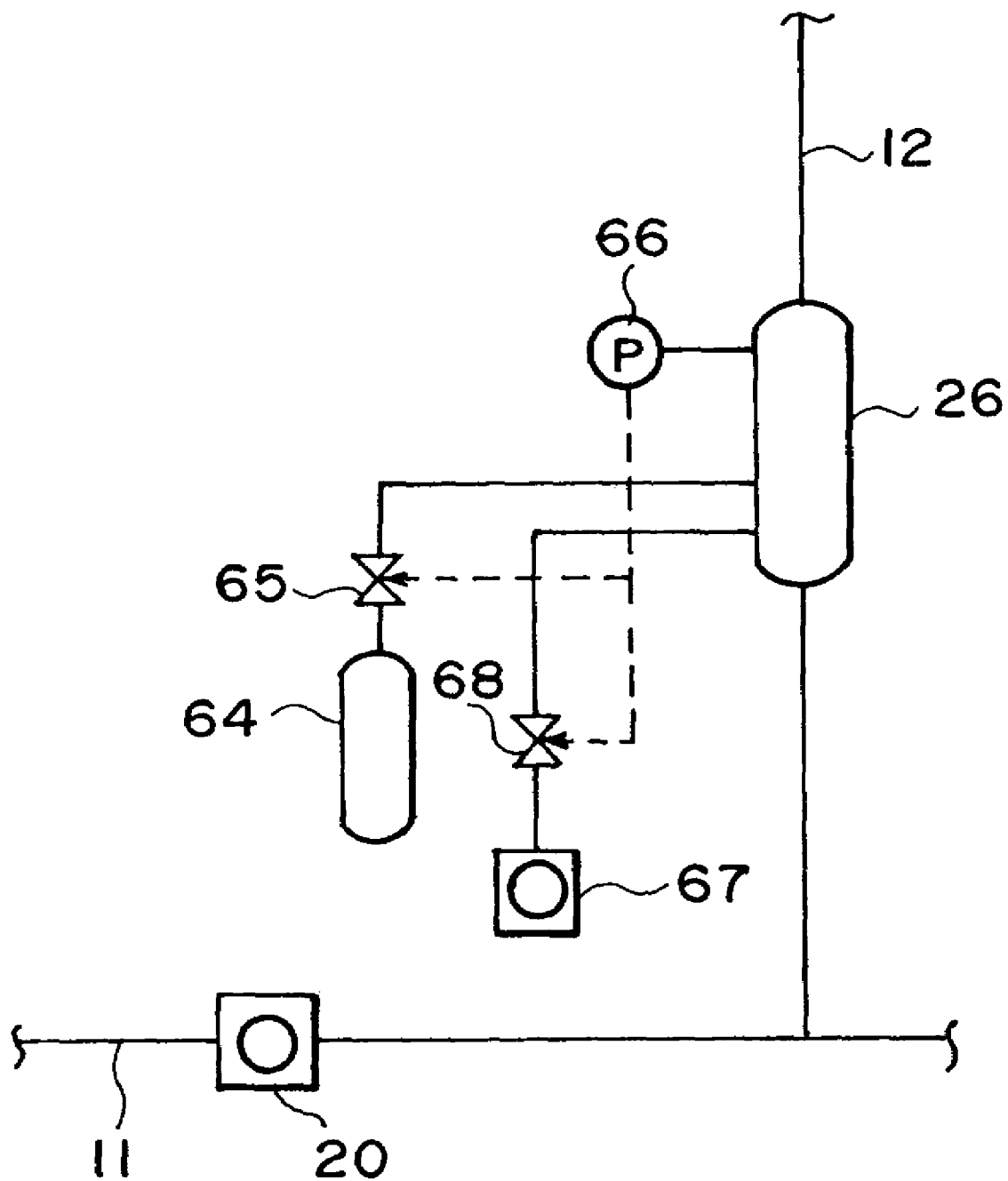
F I G. 6

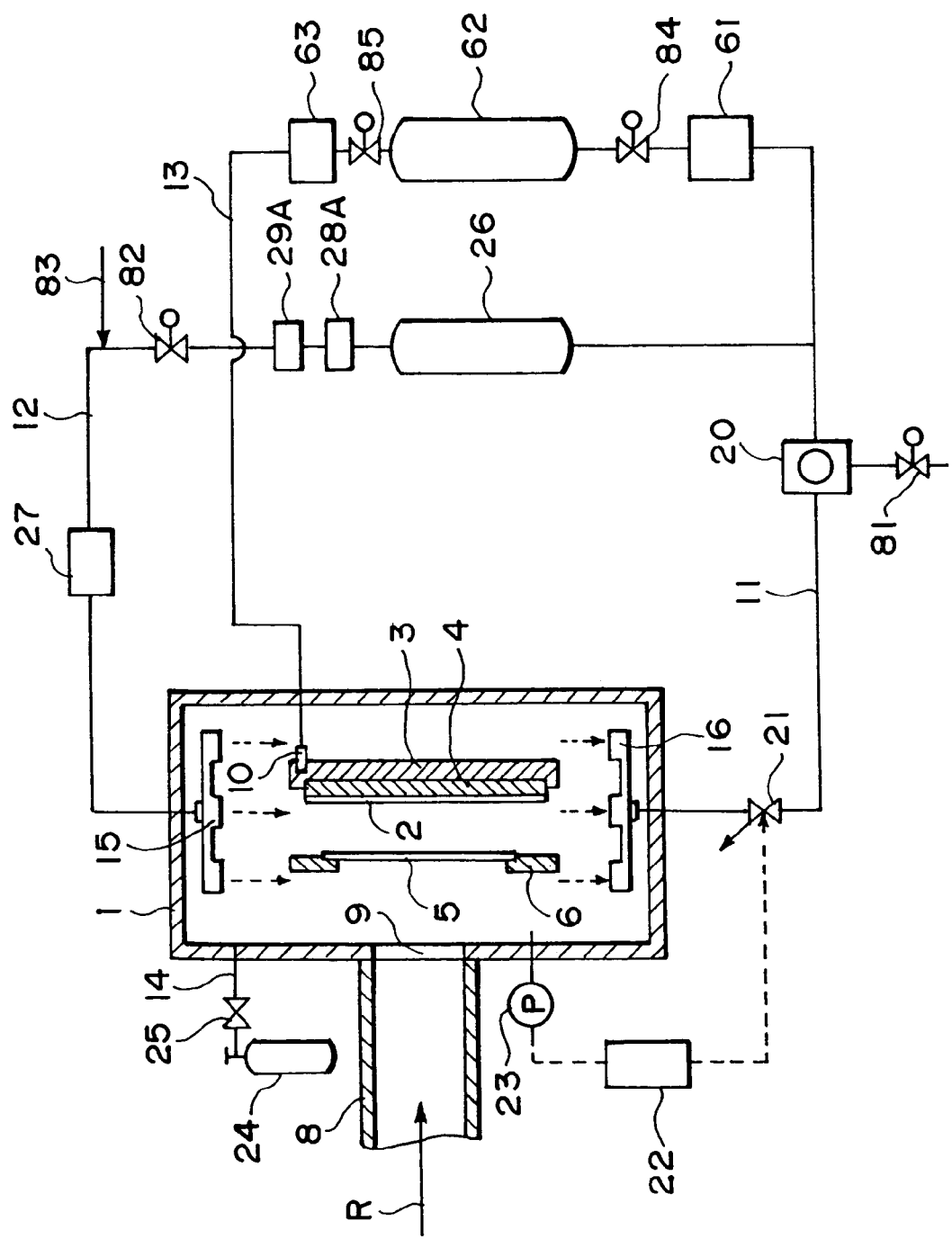
F I G. 9

(a)

(b)

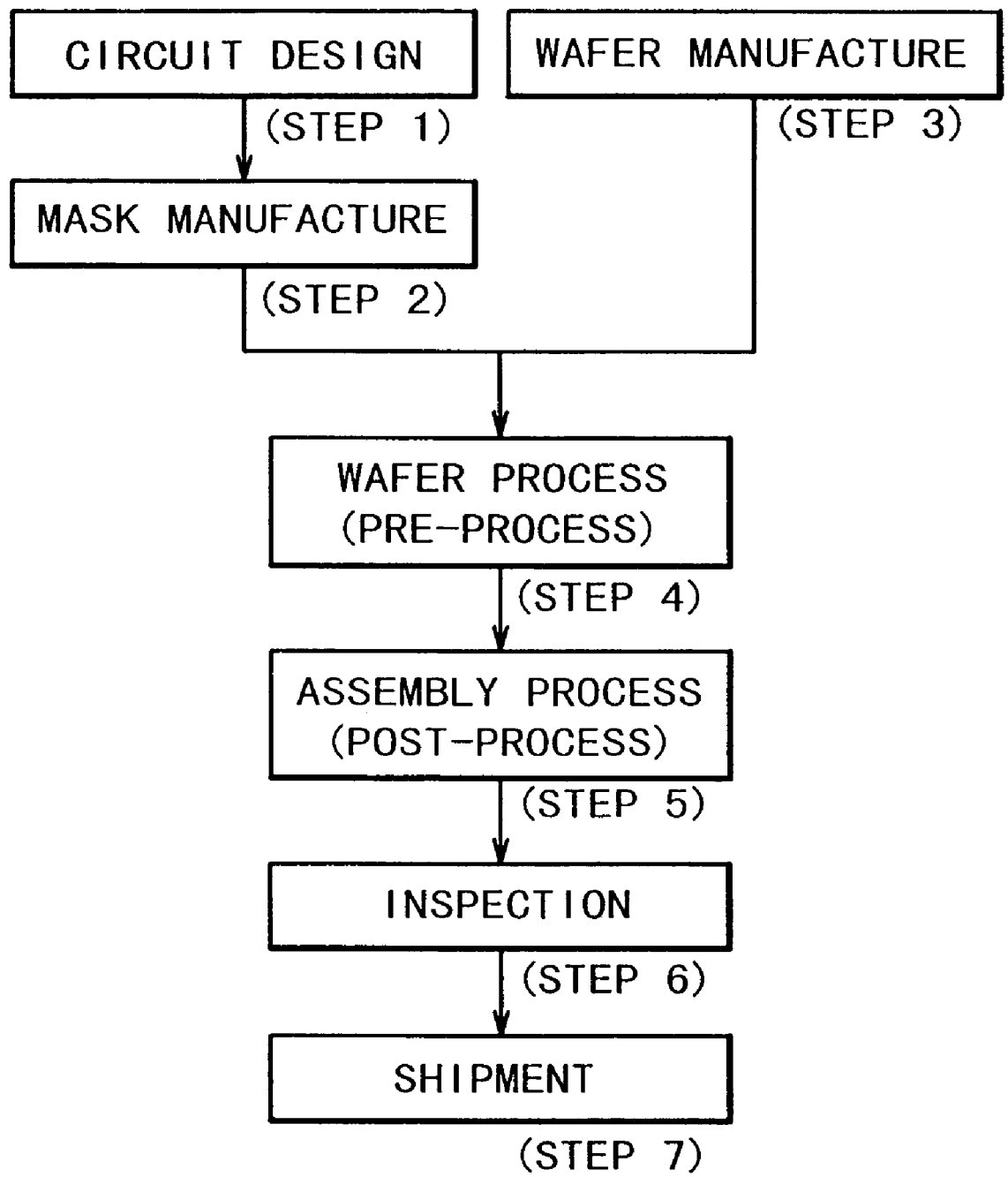
F I G. 12

PROCESSING APPARATUS, MEASURING APPARATUS, AND DEVICE MANUFACTURING METHOD

This application is a division of application Ser. No. 09/257,258, filed Feb. 25, 1999 now U.S. Pat. No. 6,616,898.

BACKGROUND OF THE INVENTION

Field of the Invention and Related Art

The present invention relates to a processing apparatus equipped with a sealed vacuum device which contains a processing portion. In particular, it relates to a processing apparatus suitable for the manufacture of a semiconductor element, or the like. It also relates to a device manufacturing method which employs such a processing apparatus.

In the manufacture of a semiconductor element or the like, an exposing apparatus is used. As semiconductor elements have been rendered microscopic and highly integrated, X-ray has come to attract attention as one of the most promising choices of exposing light. The rate of the X-ray attenuation caused by the presence of the atmospheric air is extremely high. Therefore, when an X-ray is used as the exposure beam for a semiconductor exposing apparatus, the X-ray is guided into an exposure chamber through a beam duct which has been evacuated to an extremely high degree. In an exposure chamber, a substrate positioning stage and a mask holding apparatus are placed. A substrate positioning stage accurately positions a piece of substrate wafer or the like with the use of a chuck activated by suction. A mask holding apparatus holds a mask. In order to accurately expose the predetermined area of a piece of substrate by an exposure beam, the substrate piece must be very accurately positioned. Therefore, a laser interferometry based measuring device, or the like, is placed in an exposure chamber to measure the position of the substrate positioning stage in the chamber. In order to prevent X-ray attenuation, the atmospheric air in an exposure chamber is evacuated, creating a virtual vacuum chamber, while filling the evacuated exposure chamber with a small amount of helium gas or the like to enhance the heat dissipation from the substrate in the wafer form, or a mask. Further, an exposure chamber is structured so that the pattern of the mask held by a mask holding apparatus is transferred onto the substrate by the X-ray as exposure light.

The internal pressure of an exposure chamber, or a vacuum chamber, attects the amount of X-ray transmission through the chamber. In other words, the change in the internal pressure of the vacuum chamber causes nonuniform exposure. The vacuum level falls as the atmospheric air, the gases from the bearings or the like, of the aforementioned positioning stage or the like, leak into the vacuum chamber, which in turn reduces the amount of the X-ray transmission through the internal space of the vacuum chamber. In other words, this kind of vacuum loss in an exposure chamber, or a vacuum chamber, is one of the main reasons why the performance of an exposing apparatus deteriorates in accuracy, and also why the throughput of an exposure apparatus reduces. Further, the internal temperature of a vacuum chamber locally increases due to the heat sources contained in the vacuum chamber, for example, the actuator or electrical wiring of the substrate positioning stage, the laser, or the like. Also, the internal temperature of the vacuum chamber is locally increased by the heat from the exposure light projected onto the substrate wafer and the mask. This kind of local temperature increase deforms the mask and the substrate, making it impossible to desirably transfer the mask pattern. In addition, the local temperature fluctuation creates a turbulence in the ambience gas in the measurement path of the laser beam projected by the laser interferometry based measuring device in the vacuum chamber, which results in fluctuation in the refractive index of this portion of the ambient gas. The fluctuation of the refractive index makes it impossible to accurately measure the position of the substrate positioning device with the use of a laser interferometry based measuring device. Thus, the pressure, temperature, and degree of purity of the gas in an exposure chamber, or a vacuum chamber, must be very precisely controlled as is evident from the above explanation.

Thus, the air in an exposure chamber, that is, a sealed container, is replaced with a small amount of inert gas such as pure helium, so that the internal space of the exposure chamber becomes a virtual vacuum space. Known as a method for keeping the gas in the exposure chamber pure while maintaining the internal space of the exposure chamber in the virtual vacuum state is the method disclosed in U.S. Pat. No. 5,267,292, which corresponds to EP application no. 363,168, for example. According to this patent, the internal pressure of the exposure chamber, or the sealed container, is kept constant by adjusting the flow rate at which the ambient gas in the exposure chamber is exhausted from the exposure chamber, and the flow rate at which very pure gas is allowed to flow into the exposure chamber, based on the internal pressure of the exposure chamber detected with the use of a pressure sensor. In this case, the flow rate at which the pure gas is allowed to flow into the exposure chamber is a certain number of times the flow rate at which unwanted gases flow into the exposure chamber.

Further, the following technology is disclosed in Japanese Laid-Open Patent Application No. 156625/1990. Thus, according to this patent, a sealed chamber is employed as an exposure chamber in which X-ray is used as exposure light. In operation, the atmospheric air in the sealed chamber is evacuated, and is replaced with a small amount of gas, for example, helium gas. As for the operational fluid for the static pressure bearings for the positioning stage in the evacuated sealed chamber (hereinafter, "vacuum chamber"), the ambient gas, that is, helium gas, in the vacuum chamber is used; the ambient gas is fed to the static pressure bearing after its pressure is increased with the use of a compressor. The internal pressure of the vacuum chamber is controlled by adjusting the flow rate at which the helium gas, or the ambient gas, in the vacuum chamber is exhausted. More specifically, the internal pressure of the vacuum chamber is detected, and the flow rate at which the ambient gas in the vacuum chamber is exhausted by a vacuum pump is adjusted in response to the detected internal pressure of the vacuum chamber, so that the internal pressure of the vacuum chamber remains virtually constant. The helium gas suctioned out of the vacuum chamber by the vacuum pump is recirculated into the vacuum chamber to reduce helium gas consumption, while keeping constant the purity of the helium gas in the vacuum chamber so that exposure does net become uneven.

Japanese Laid-Open Patent Application No. 264404/1996 also discloses an ambient gas recirculating system. According to this patent, the ambient gas in a vacuum chamber is suctioned out by a vacuum pump, so that the internal pressure of the vacuum chamber remains constant at a predetermined level. The ambient gas suctioned out of the vacuum chamber is compressed by a compressor, and stored in a tank. Then, this ambient gas compressed and stored in the tank is recirculated into the vacuum chamber after being purified by a gas purifier, so that the rate at which ambient gas such as helium gas, which is rather expensive, is utilized, is improved, reducing thereby the cost for running the apparatus.

There is a technology for controlling the internal environment of a semiconductor exposing apparatus, the ambient gas of which is the atmospheric air. According to this technology, the chamber in which an exposing apparatus is placed is connected to an air conditioning apparatus, which prevents the internal temperature of the chamber from being increased by the heat sources, for example, a mechanical power source such as a motor, electrical wiring, a laser, and the like, in the chamber, so that the internal temperature of the chamber remains constant at a predetermined level. This type of air conditioning apparatus is constituted of a fan, and a heat exchanger such as a heater or a cooler. It takes in the air from within a chamber or the atmospheric air, adjusts the temperature of the air by the heat exchanger, and sends the air into the chamber by the fan through the intake opening of the chamber. In other words, it controls the temperature of the ambient air in the chamber by circulating the air through a predetermined path, so that the temperature of the ambient air in the chamber does not fluctuate, and does not become uneven. Further, the dust in the air is removed by a filter disposed in the air circulation path so that the cleanliness of the chamber is controlled.

However, the above described exposure chamber based on the conventional technologies has a problem, even though it can reduce unevenness in temperature in the chamber by eliminating local temperature increase, and therefore, the ambient gas in the chamber is prevented from becoming turbulent. The problem is, if the fan of the air conditioner is disposed more than a certain distance away from the exposing portion, the velocity of the down flow created in the chamber does not reach a predetermined velocity, and therefore, the fan must be disposed immediately adjacent to the exposing portion. If the fan is placed immediately adjacent to the exposing portion, the vibration generated by the fan is transmitted through the plumbing or the like, causing the positioning stage or mask holding apparatus of the exposing portion to vibrate, even if the fan is not directly in contact with the exposing portion. The vibration of the stage or the like causes the positional relationship between a substrate and a mask to vary, making the line width of the pattern which will be formed on the substrate, different from the predetermined line width of a mask. Also, the vibration reduces resolution. Further, the driving portion of the fan generates a large amount of heat, and therefore, it must be cooled by providing it with the plumbing for water cooling. Provision of such plumbing, which requires a space for the plumbing, increases the size, or the foot print, of each exposing apparatus, reducing the number of exposing apparatuses which can be placed in each floor. This results in cost increase. In addition, if this type of air conditioning apparatus is disposed in an ambient vacuum, the lubricant in the rotational portions of the fan evaporates into the ambient vacuum, extremely reducing the durability of the fan. Thus, it is not desirable to place an air conditioning apparatus, which uses a fan, in a vacuum chamber in which there is an exposing apparatus, the exposing light of which is X-ray.

Technologies, such as the above described, for controlling the pressure, temperature, and purity of the ambient gas in a vacuum chamber which contains an exposing apparatus, to prevent the attenuation of X-ray, has been long known. However, those technologies suffer from problems. That is, they do not actively generate flows in the ambience gas in a vacuum chamber. Therefore, they fail to enhance the dissipation of the heat generated by the irradiation of the exposure light upon a substrate or a mask, failing to prevent the temperature increase in the vacuum chamber. Also, they fail to sufficiently remove the heat generated by the other heat sources, for example, the driving means and electric wiring of the positioning stage, laser, and the like, in the vacuum chamber. Consequently, the temperature in the vacuum chamber locally increases or varies, which results in uneven exposure. In addition, the mask or the substrate is deformed by the heat generated by the exposure light. In other words, these technologies fail to achieve a high level of preciseness in pattern transferring.

Further, as described above, in order to precisely position a substrate, a laser interferometry based measuring device is used for measuring the position of the substrate positioning stage in the vacuum chamber in which an exposing apparatus is disposed. If a turbulence is generated in the measurement path of the laser beam projected by the measuring apparatus, by the aforementioned heat, the reflective index of the ambient gas in the path varies, which causes measurement errors. This decreases preciseness in substrate positioning. Thus, the occurrence of turbulence in the ambient gas in the vacuum chamber, which adversely affects the accuracy of a laser interferometry based measuring device, must be prevented, so that the environment in the vacuum chamber remains stable.

Elaborating further on the reflective index of a laser beam in the atmospheric air in the normal stage; if the temperature changes 1° C., the reflective index changes by approximately 1 ppm. This change in the reflective index causes an error in the measurement by a laser interferometry based measuring device. For example, if the true distance from the laser interferometry based measuring device to the stage is 500 mm, a temperature change of 1° C. causes a measurement error of 500 nm, or 1 ppm of 500 mm. Since the accuracy in aligning a mask with a substrate is required to be no more than 10 nm, the accuracy of the interferometer for measuring the position of the stage must be no more than 5 nm. Thus, in order to reduce the measurement error of the interferometer, the temperature fluctuation in the measurement light path of the interferometer should be kept within approximately 0.01° C. The reflective index fluctuation caused by temperature fluctuation in a helium filled chamber with an internal pressure of one fifth the atmospheric air pressure is approximately one fortieth the reflective index in an exposure chamber filled with an atmospheric air with the normal pressure. However, the temperature fluctuation should be kept within approximately 0.4° C. Even under this kind of condition, in order to keep the measurement error of the interferometer below 2.5 nm to improve alignment accuracy, the temperature fluctuation must be kept within 0.2° C. However, the vacuum chamber contains heat sources, that is, the driving means and wiring for the positioning stage, laser, and the like. They warm up the ambient gas adjacent to them, and the warmed ambient gas sometimes drifts into the measurement light path of the interferometer, causing the interferometer to be inaccurate.

A vacuum chamber, which contains a processing portion such as an exposing apparatus, also contains a substrate positioning stage for accurately positioning a substrate. The substrate positioning stage is provided with a suction chuck for holding a substrate. This type of chuck is connected to a vacuum pump, which is disposed outside the vacuum chamber, and is activated to maintain a certain amount of suction to keep a substrate held to the suction chuck of the substrate positioning stage. Thus, each time the vacuum pump is activated, a certain amount of the ambient gas in the vacuum chamber is exhausted through the suction chuck, and therefore, the internal pressure of the vacuum chamber temporarily decreases. In other words, exhausting the ambient gas in the vacuum chamber by the vacuum pump for the suction chuck occurs every time a substrate is held to the positioning stage by suction. In the case of a vacuum chamber based on the prior technology, a certain amount of fresh ambient gas is added to the vacuum chamber. However, this supply of fresh ambient gas is for compensating for the leak of the atmospheric air into the vacuum chamber. In other words, it is not added in consideration of the loss of the ambient gas caused by the vacuum pump for the suction chuck. Therefore, if a processing apparatus is operated for a long period of time, the amount of the ambient gas in the vacuum chamber exhausted by the vacuum pump for the suction chuck becomes too large to be compensated for by the certain amount of fresh ambient gas added to the vacuum chamber to compensate for the aforementioned leak of the atmospheric air into the vacuum chamber. Consequently, the internal pressure of the vacuum chamber gradually decreases in spite of the addition of the aforementioned fresh supply of ambient gas; it is possible that the internal pressure of the vacuum chamber cannot be accurately controlled. If the internal pressure of the vacuum chamber cannot be accurately controlled, X-ray transmittance is adversely affected, resulting in uneven exposure. In other words, exposure accuracy deteriorates, which is one of the essential problems in the prior technologies.

Also in the cases of the above described prior technologies, the ambient gas in a vacuum chamber is suctioned out to maintain the internal pressure of the vacuum chamber at a predetermined vacuum level. Then, the ambient gas suctioned out of the vacuum chamber is purified, and recirculated into the vacuum chamber, improving the rate at which helium gas, that is, expensive ambient gas, is utilized during the operation of a processing apparatus. This reduces the consumption of the expensive ambient gas, reducing thereby the cost for running the apparatus. However, when it is necessary to stop the apparatus for the maintenance of a semiconductor exposing apparatus or the like disposed in the vacuum chamber, or at the end of an operation, first the ambient gas in the vacuum chamber is released into the atmosphere from the vacuum chamber or the ambient gas recirculating system. Next, the vacuum chamber is filled with nitrogen gas or air with the normal pressure. Then, the maintenance operation is carried out, or the apparatus is completely stopped. In other words, each time the apparatus is stopped for maintenance or the like, helium gas as the ambient gas for the vacuum chamber, which is rather expensive, is released into the atmosphere. Therefore, the prior technologies could not reduce helium gas consumption; they could not reduce the cost for running a processing apparatus.

SUMMARY OF THE INVENTION

The present invention is made in consideration of the above described problems which must be solved. The primary object of the present invention is to provide a processing apparatus, the internal ambience of which is stable. This is accomplished by creating a flow of the ambient gas in a predetermined direction in the sealed vacuum chamber of the processing apparatus to eliminate the unevenness in the internal temperature of the sealed vacuum chamber while preventing the ambient gas in the vacuum chamber from becoming turbulent.

Another object of the present invention is to provide a processing apparatus, the internal pressure of the sealed vacuum container of which is controlled with higher accuracy. This is accomplished by effectively compensating for the decrease in the internal pressure of the sealed vacuum chamber.

Another object of the present invention is to provide a processing apparatus which consumes a much smaller amount of ambient gas, and therefore, costs less to run, compared to conventional apparatus. This is accomplished by storing the ambience gas in its sealed vacuum container, in the ambient gas recirculating system before stopping the apparatus.

Another object of the present invention is to provide a device manufacturing method which employs a processing apparatus such as those described above.

A processing apparatus according to the present invention for accomplishing at least one of the above described objects is characterized in that it comprises:

a sealed vacuum chamber which contains a processing portion;

a pressure controlling system which keeps the internal pressure of the sealed vacuum chamber constant at a predetermined level by exhausting the ambient gas in the sealed vacuum chamber;

and an ambient gas recirculating system which recirculates the ambient gas exhausted from the sealed vacuum chamber back into the sealed vacuum chamber; and wherein the ambient gas recirculated by the ambience gas recirculating system is blown into the sealed vacuum chamber so that a gas flow is generated in a predetermined direction along the aforementioned processing portion.

Regarding the above processing apparatus, it is desired that ambient gas in the sealed vacuum chamber is exhausted by a pump or a compressor;

the ambient gas recirculated by the ambience gas recirculating system is blown into the sealed vacuum chamber through an intake orifice disposed in the top portion of the sealed vacuum chamber, so that a downward gas flow is generated toward an exhaust orifice disposed in the bottom portion of the sealed vacuum chamber;

the ambient gas recirculated by the ambience gas recirculating system is blown into the sealed vacuum chamber, toward the light path of the laser interferometry based measuring device disposed in the sealed vacuum chamber;

a certain portion of the ambient gas recirculated by the ambient gas recirculating system is blown into the sealed vacuum chamber through the intake orifice disposed in the top portion of the sealed vacuum chamber, so that a downward gas flow is generated toward an exhaust orifice disposed in the bottom portion of the sealed vacuum chamber, while the rest of the gas recirculated by the gas recirculating system is blown into the vacuum chamber, toward the light path of the laser interferometry based measuring device disposed in the sealed vacuum chamber;

the ambient gas recirculating system is provided with a chemical filter, which is located where the ambient pressure is equal to, or greater than, the atmospheric air pressure;

the ambient gas recirculating system is provided with a temperature control portion for adjusting the temperature of the ambient gas;

a sensor for measuring the temperature of the ambient gas is disposed at the intake orifice, and the temperature control portion is controlled in response to the results of the measurement by the sensor;

a portion of the ambient gas recirculating system which exhausts the ambient gas in the sealed vacuum chamber is constituted of two ambient gas recirculating branches, and a valve for controlling the ambient gas flow rate is connected into the branch with the smaller flow rate;

the processing portion contained in the sealed vacuum chamber is an exposing apparatus for substrate exposure.

The second processing apparatus in accordance with the present invention for accomplishing one of the aforementioned objects is characterized in that it comprises:

a sealed vacuum chamber which contains a processing portion; and an ambient gas recirculating system which exhausts the ambient gas in the sealed vacuum chamber, increases the pressure of the exhausted gas, and recirculates it into the vacuum chamber, with the use of a compressor or a pump;

wherein the ambient gas recirculated by the ambient gas recirculating system is blown into the sealed vacuum chamber so that a gas flow is generated in a predetermined direction, adjacent to the aforementioned processing portion.

Regarding the above processing apparatus, it is desired that the ambient gas recirculated by the ambient gas recirculating system is blow into the sealed vacuum chamber through an intake orifice disposed in the top portion of the sealed vacuum chamber, so that a downward gas flow is generated toward an exhaust orifice disposed in the bottom portion of the sealed vacuum chamber;

the ambient gas recirculated by the ambient gas recirculating system is blow into the sealed vacuum chamber, toward the light path of the laser interferometry based measuring device disposed in the sealed vacuum chamber;

a certain portion of the ambient gas recirculated by the ambience gas recirculating system is blown into the sealed vacuum chamber through the intake orifice disposed in the top portion of the sealed vacuum chamber, so that a downward gas flow is generated toward an exhaust orifice disposed in the bottom portion of the sealed vacuum chamber, while the, rest of the gas recirculated by the gas recirculating system is blown into the vacuum chamber, toward the light path of the laser interferometry based measuring device disposed in the sealed vacuum chamber;

the ambient gas recirculating system is provided with a chemical filter, which is located where the ambient pressure is equal to, or greater than, the atmospheric air pressure;

the ambient gas recirculating system is provided with a temperature control portion for adjusting the temperature of the ambient gas;

a sensor for measuring the temperature of the ambient gas is disposed at the intake orifice, and the temperature control portion is controlled in response to the results of the measurement by the sensor;

a portion of the ambient gas recirculating system which exhausts the ambient gas in the sealed vacuum chamber is constituted of two ambient gas recirculating branches, and a valve for controlling the ambient gas flow rate is connected into the branch with the smaller flow rate;

the processing portion contained in the sealed vacuum chamber is an exposing apparatus for substrate exposure.

The third processing apparatus in accordance with the present invention for accomplishing one of the aforementioned object is characterized in that it comprises:

a sealed vacuum chamber which contains a processing portion;

a pressure controlling system which keeps the internal pressure of the sealed vacuum chamber constant at a predetermined level by exhausting the ambient gas in the sealed vacuum chamber;

an ambient gas recirculating system which increases the pressure of the ambient gas exhausted from the sealed vacuum chamber, and recirculates this exhausted ambient gas with the increased pressure into the sealed vacuum chamber; and an ambient gas supplying device for adding ambient gas to the sealed vacuum chamber.

Regarding the above processing apparatus, it is desired that the pressure controlling system comprises:

a valve for controlling the flow rate of the ambient gas;

a pump or a compressor;

a pressure sensor for detecting the internal pressure of the vacuum chamber; and a controller which controls the ambient gas flow rate control valve in response to the results of the measurement by the pressure sensor;

the ambient gas recirculating system comprises:

a tank for storing the ambience gas exhausted by the pump or compressor; and a flow rate control portion or a regulator for recirculating the ambient gas stored in the tank, into the sealed vacuum chamber;

the ambient gas recirculating system is provided with a chemical filter, which is located where the ambient pressure is equal to, or greater than, the atmospheric air pressure;

the ambient gas recirculating system is provided with a temperature control portion for adjusting the temperature of the ambient gas;

a sensor for measuring the temperature of the ambient gas is disposed at the intake orifice, and the temperature control portion is controlled in response to the results of the measurement by the sensor;

a portion of the ambient gas recirculating system which exhausts the ambient gas in the sealed vacuum chamber is constituted of two ambient gas recirculating branches, and a valve for controlling the ambient gas flow rate is connected into the branch with the smaller flow rate;

the processing portion contained in the sealed vacuum chamber is an exposing apparatus for substrate exposure.

The fourth processing apparatus in accordance with the present invention for accomplishing one of the aforementioned object is characterized in that it comprises:

a sealed vacuum chamber which contains a processing portion;

a pressure controlling system which keeps the internal pressure of the sealed vacuum chamber constant at a predetermined level by exhausting the ambient gas in the sealed vacuum chamber; and an ambient gas recirculating system which recirculates the ambient gas exhausted from the sealed vacuum chamber, back into the sealed vacuum chamber; and a high pressure ambient gas recirculating system which increases the pressure of the ambient gas exhausted from the sealed vacuum chamber, and recirculates this ambient gas with the increased pressure into the sealed vacuum chamber.

Regarding the above apparatus, it is desired that the apparatus comprises:

an ambient gas supply system for adding ambient gas to the sealed vacuum chamber;

the pressure controlling system comprises:

a valve for controlling the flow rate of the ambient gas;

a pump or a compressor;

a pressure sensor for detecting the internal pressure of the vacuum chamber; and a controller which controls the ambient gas flow rate control valve in response to the results of the measurement by the pressure sensor;

the ambient gas recirculating system comprises a tank for storing the ambient gas exhausted by the pump or compressor, and a flow rate control portion, and recirculates the ambient gas stored in the tank into the sealed vacuum chamber at a predetermined flow rate through the flow rate control portion; and the high pressure ambient gas recirculating system comprises: a high pressure tank for storing the ambient gas exhausted by the pump or compressor and then highly compressed; and a regulator which recirculates the high pressure ambient gas to the sealed vacuum chamber while allowing the gas to decompress;

the ambient gas recirculating system comprises a control valve which controls the gas flow rate of the ambient gas recirculating system in response to the results of the measurement of a pressure sensor for measuring the internal pressure of the tank in the ambient gas recirculating system;

the control valve adds ambient gas to the tank, or suctions out the ambient gas in the tank;

a pump for activating a suction chuck contained in the sealed vacuum chamber is connected into the ambient gas recirculating system;

at least one of the ambient gas recirculating system or high pressure ambient gas recirculating system, or both, are provided with a chemical filter, which is located where the ambient pressure is equal to, or greater than, the atmospheric air pressure;

at least one of the ambient gas recirculating system or high pressure ambient gas recirculating system, or both, are provided with a temperature control portion for adjusting the temperature of the ambient gas;

a sensor for measuring the temperature of the ambient gas is disposed at the intake orifice, and the temperature control portion is controlled in response to the results of the measurement by the sensor;

a portion of the ambient gas recirculating system which exhausts the ambient gas in the sealed vacuum chamber is constituted of two ambient gas recirculating branches, and a valve for controlling the ambient gas flow rate is connected into the branch with the smaller flow rate;

the processing portion contained in the sealed vacuum chamber is an exposing apparatus for substrate exposure.

The fifth processing apparatus in accordance with the present invention for accomplishing one of the aforementioned objects is characterized in that it comprises:

a sealed vacuum chamber which contains a processing portion;

a pressure controlling system which keeps the internal pressure of the sealed vacuum chamber constant at a predetermined level by exhausting the ambient gas in the sealed vacuum chamber;

an ambient gas recirculating system which recirculates the ambient gas exhausted from the sealed vacuum chamber back into the sealed vacuum chamber; and a high pressure ambient gas recirculating system which increases the ambient gas exhausted from the sealed vacuum chamber, and recirculates this ambient gas with the high pressure into the sealed vacuum chamber;

wherein before the processing apparatus is stopped, at least a portion of the ambient gas is stored in at least one of the ambient gas recirculating system or high pressure ambient gas recirculating system, or both.

Regarding the above processing apparatus, it is desired that the apparatus also comprises:

an ambient gas supplying system for adding ambient gas to the sealed vacuum chamber;

the pressure controlling system comprises:

a valve for controlling the flow rate of the ambient gas;

a pump or a compressor;

a pressure sensor for detecting the internal pressure of the vacuum chamber; and a controller which controls the ambient gas flow rate control valve in response to the results of the measurement by the pressure sensor;

the ambient gas recirculating system comprises a tank for storing the ambient gas exhausted by the pump or compressor, and a flow rate control portion, and recirculates the ambient gas stored in the tank into the sealed vacuum chamber at a predetermined flow rate through the flow rate control portion; and the high pressure ambient gas recirculating system comprises: a high pressure tank for storing the ambient gas exhausted by the pump or compressor and then highly compressed; and a regulator which recirculates the high pressure ambient gas to the sealed vacuum chamber while allowing the gas to decompress;

a valve is placed on both the upstream and downstream sides of at least one of the tank and high pressure tank;

when the processing apparatus is stopped; the valve on the downstream side of the tank is closed, the ambient gas is sent into the tank by activating the pump or compressor; and then, the valve on the upstream side of the tank is closed to keep the ambient gas stored in the tank;

at least one of the ambient gas recirculating system and high pressure ambient gas recirculating system is provided with a bypass to the sealed vacuum chamber;

wherein the processing apparatus is stopped, the recirculating system is opened to the bypass, and the ambient gas is stored in the recirculating system and bypass;

at least one of the ambient gas recirculating system and high pressure ambient gas recirculating system is provided with a chemical filter, which is located where the ambient pressure is equal to, or greater than, the atmospheric air pressure;

at least one of the ambient gas recirculating system and high pressure ambient gas recirculating system is provided with a temperature control portion for adjusting the temperature of the ambient gas;

a sensor for measuring the temperature of the ambient gas is disposed at the intake orifice, and the temperature control portion is controlled in response to the results of the measurement by the sensor;

a portion of the ambient gas recirculating system which exhausts the ambient gas in the sealed vacuum chamber is constituted of two ambient gas recirculating branches, and a valve for controlling the ambient gas flow rate is connected into the branch with the smaller flow rate;

the processing portion contained in the sealed vacuum chamber is an exposing apparatus for substrate exposure.

The sixth processing apparatus in accordance with the present invention for accomplishing one of the aforementioned object is characterized in that it comprises:

a sealed vacuum chamber which contains a processing portion;

an ambient gas recirculating system which exhausts the ambient gas in the sealed vacuum chamber, increases the pressure of the exhausted ambient gas, and recirculates the exhausted ambient gas with the higher pressure back into the sealed vacuum chamber, with the use of a compressor or a pump;

wherein the ambient gas recirculated by the recirculating system is blown into the sealed, vacuum chamber so that a gas flow is generated in a predetermined direction, adjacent to the measuring portion.

Regarding the above processing apparatus, it is desired that the recirculating system is provided with a chemical filter, which is located where the ambient pressure is equal to, or greater than, the atmospheric air pressure.

Further, according to another aspect of the present invention for accomplishing one of the aforementioned object, a device manufacturing method, a device manufacturing method is characterized in that it employs the above described first, second, third, fourth, fifth or sixth processing apparatus in accordance with the present invention.

According to the primary aspect of the present invention, a processing apparatus comprises: a sealed vacuum chamber which contains a processing portion; a pressure controlling system which keeps the internal pressure of the sealed vacuum chamber constant at a predetermined level by exhausting the ambient gas in the sealed vacuum chamber; and an ambient gas recirculating system which recirculates the ambient gas exhausted from the sealed vacuum chamber back into the sealed vacuum chamber; wherein the ambient gas recirculated by the ambience gas recirculating system is blown into the sealed vacuum chamber so that a gas flow is generated in a predetermined direction along the aforementioned processing portion. Therefore, the heat or the like generated by the heat sources in the sealed vacuum chamber is sufficiently removed by heat dissipation, preventing the internal temperature of the sealed vacuum chamber from becoming locally uneven. Thus, the ambient gas in the sealed vacuum chamber is prevented from becoming turbulent. Consequently, the ambient gas in the sealed vacuum chamber remains stable.

Further, with the use of a vacuum pump as the means for driving the ambient gas in the ambient gas recirculating system, vibration such as the one caused by the blower of a conventional air conditioner does not occur, reducing the overall amount of the vibration, improving therefore the apparatus in terms of resolution. Further, the employment of a vacuum pump saves space, which reduces the apparatus cost. Also, providing the ambient gas recirculating system in a processing apparatus with ordinary filters or chemical filters makes it possible to efficiently remove the particles in the ambient gas, or substances produced through chemical reaction triggered among the elements in the ambient gas by exposure light. Therefore, exposure energy is prevented from attenuating, preventing thereby the throughput of the apparatus from reducing, as well as preventing uneven exposure.

Therefore, application of the present invention to a semiconductor exposing apparatus makes it possible to more precisely control the pressure of the ambient gas in a vacuum chamber as an exposing chamber, preventing exposing light such as X-ray from attenuating, preventing uneven exposure, preventing a mask or a substrate from being inaccurately positioned due to heat, reducing the possibility of measurement error, and improving positioning accuracy and alignment accuracy. Therefore, highly accurate exposure is possible. In addition, application of the present invention to a measuring apparatus makes it possible to very accurately measure an object, that is, without the possibility of measurement error.

Further, according to another aspect of the present invention, a processing apparatus comprises: a sealed vacuum chamber which contains a processing portion; a pressure controlling system which keeps the internal pressure of the sealed vacuum chamber constant at a predetermined level by exhausting the ambient gas in the sealed vacuum chamber; and an ambient gas recirculating system which recirculates the ambient gas exhausted from the sealed vacuum chamber, back into the sealed vacuum chamber; and a high pressure ambient gas recirculating system which increases the pressure of the ambient gas exhausted from the sealed vacuum chamber, and recirculates this ambient gas with the increased pressure into the sealed vacuum chamber. In this processing apparatus, an additional supply of fresh ambient gas is added to the ambient gas recirculating system from an ambient gas supply source other than the ambient gas supply source, vacuum pump for operating a suction chuck, high pressure tank connected to the high pressure ambient gas recirculating system, and the like, which belong to the aforementioned ambient gas recirculating system. Therefore, the pressure decrease which occurs in the sealed vacuum chamber and the ambient gas recirculating system as the ambient gas is exhausted by the vacuum pump for holding a substrate by suction is effectively compensate for. Thus, the internal pressure of the sealed vacuum chamber is controlled with improved accuracy.

Further, according to another aspect of the present invention, a processing apparatus comprises: a sealed vacuum chamber which contains a processing portion; a pressure controlling system which keeps the internal pressure of the sealed vacuum chamber constant at a predetermined level by exhausting the ambient gas in the sealed vacuum chamber; and an ambient gas recirculating system which recirculates the ambient gas exhausted from the sealed vacuum chamber, back into the sealed vacuum chamber; and a high pressure ambient gas recirculating system which increases the pressure of the ambient gas exhausted from the sealed vacuum chamber, and recirculates this ambient gas with the increased pressure into the sealed vacuum chamber. In this processing apparatus, when the apparatus is stopped for maintenance or the like, at least a certain portion of the ambient gas is stored in the ambient gas recirculating system and/or the high pressure ambient gas recirculating system, in particular, in the high pressure tanks of the recirculating systems. In other words, the ambient gas is not entirely discharged into the atmospheric air. With this arrangement, the consumption of the ambient gas, that is, helium gas or the like, which is rather expensive, is greatly reduced, making it possible to greatly reduce the cost for running the apparatus.

Further, according to another aspect of the present invention, a processing apparatus comprises: a sealed vacuum chamber which contains a processing portion; and an ambient gas recirculating system which exhausts the ambient gas in the sealed vacuum chamber, increases the pressure of the exhausted gas, and recirculates it into the vacuum chamber, with the higher pressure back into the sealed vacuum chamber, with the use of a compressor or a pump. In this apparatus, a means for measuring the distances among the components in the sealed vacuum chambers, and the amounts of their shifts, is disposed in the sealed vacuum chamber. In operation, the ambient gas recirculated by said ambient gas recirculating system is blown into said sealed vacuum chamber so that a gas flow is generated in a predetermined direction along the aforementioned processing portion, preventing the internal temperature of the sealed vacuum chamber from locally becoming uneven, preventing thereby the ambient gas becoming locally turbulent. Therefore, the ambient gas in the sealed vacuum chamber remains stable, eliminating the possibility of measurement error of the measuring means. This apparatus further comprises a chemical filter, which is connected into the ambient gas recirculating system, at a point where the pressure of the ambient gas is higher compared to the other portions of the ambient gas recirculating system. Therefore, it is possible to effectively remove the particles in the ambient gas, and the substances produced in the ambient gas through the chemical reactions among the elements in the ambient gas.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 1 is a schematic view of an embodiment of the present invention in the form of a processing apparatus, that is, a semiconductor exposing apparatus.

FIG. 3 is a schematic view of an embodiment of the present invention in the form of a measuring apparatus for a processing apparatus in accordance with the present invention.

FIG. 6 is a schematic view of a portion of the system for compensating for the pressure decrease in the tank in the processing apparatus illustrated in FIG. 5.

FIG. 9 is a schematic view of another embodiment of the present invention in the form of a processing apparatus, that is, an exposing apparatus.

FIG. 12 is a flow chart for a semiconductor device manufacturing process.

DESCRIPTION OF THE PREFERRED EMBODIMENTS

Figure 2:
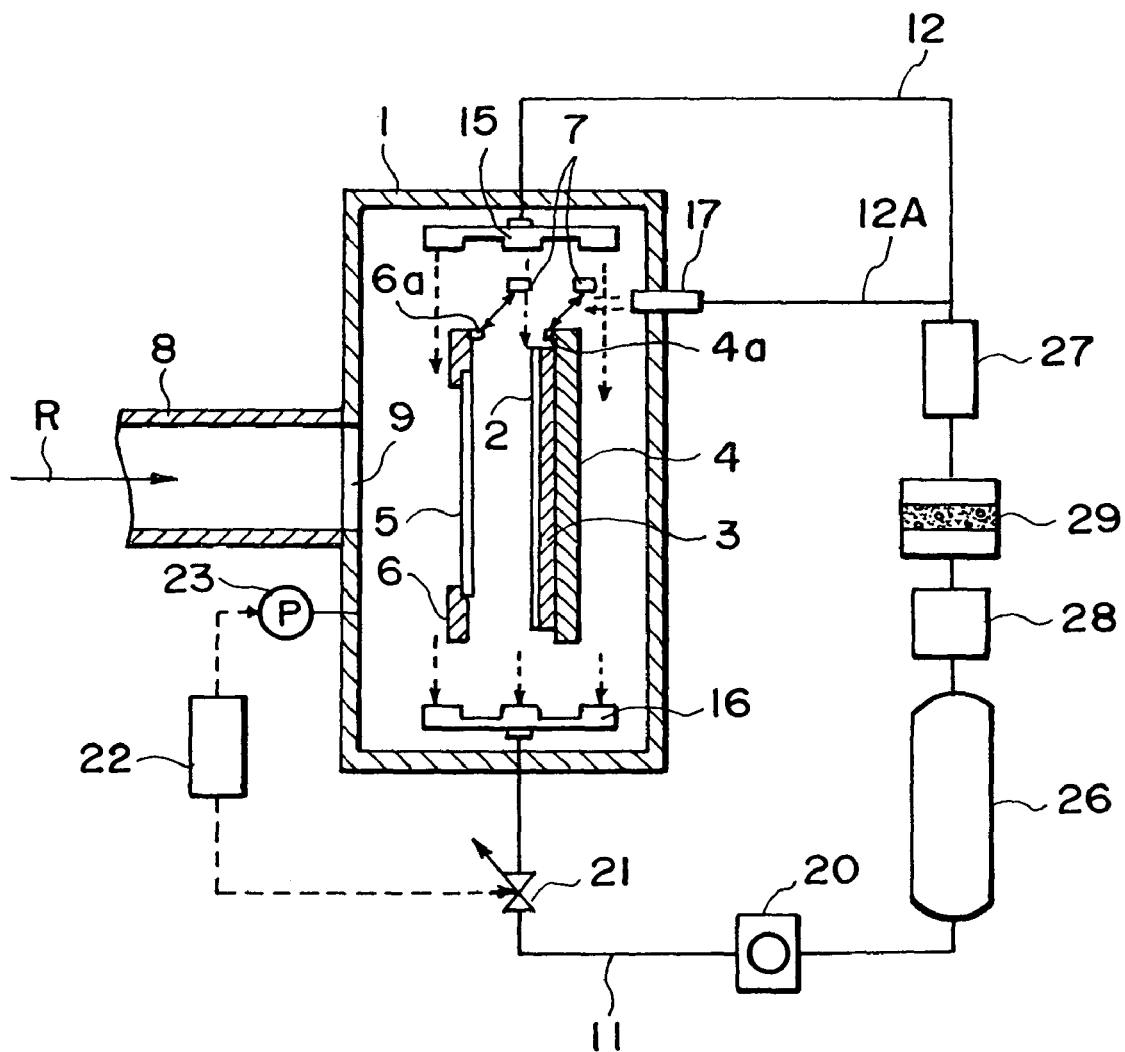
FIG. 2 is a schematic view of another embodiment of the present invention in the form of a processing apparatus, that is, a semiconductor exposing apparatus.

Preferred embodiments of the present invention will now be described in detail in accordance with the accompanying drawings.

Referring to FIG. 1, an embodiment of the present invention will be described. FIG. 1 is a schematic view of an embodiment of the present invention in the form of a processing apparatus, that is, a semiconductor exposing apparatus.

A referential character 4 designates a positioning stage equipped with a suction chuck 3. The positioning stage 4 is placed in a sealed vacuum container 1 (hereinafter, "vacuum chamber"). The suction chuck 3 holds a piece of substrate 2 or wafer, with the use of suction. A referential character 6 designates a mask holding apparatus which holds a mask 5. Designated by a referential character 7 is a laser interferometry based measuring device, which is used to measure the position of the positioning stage 4. The positioning stage 4 which is holding the substrate 2 is accurately positioned based on the results of the measurement by the laser interferometry based measuring device. A referential character 8 designates a beam duct for guiding X-ray R emitted from an X-ray source (unillustrated) such as a synchrotron, into the vacuum chamber 1 while maintaining an extremely high degree of vacuum. A referential character 9 designates a beryllium window which separates the environment in the vacuum chamber 1 from the extremely vacuum environment in the beam duct 8.

The laser interferometry based measuring device 7 for measuring the position of the positioning stage 4 projects a laser beam emitted from a laser, onto mirrors 4a and 6a located on the positioning stage 4 and the mask holding apparatus 6, respectively. The distance between the mirrors 4a and 6a is measured by detecting the laser beam reflected by the mirrors 4a and 6a, and based on the results of this measurement, the positioning stage 4 is moved to be accurately positioned. After the positioning stage is accurately positioned, the X-ray R is guided into the vacuum chamber 1 through the beam duct 8 and the beryllium window 9. Then, the X-ray R transfers the pattern of the mask 5 held by the mask holding apparatus 6, onto the substrate 2, or the wafer, attached to the suction chuck of the positioning stage 4 by suction.

The system for controlling the internal low pressure ambience of the vacuum chamber comprises an exhaust gas line 11, a recirculatory supply line 12, and a supply line branch 12A. The exhaust gas line 11 controls the internal pressure (degree of vacuum) of the vacuum chamber 1 by exhausting the ambient gas such as helium gas in the vacuum chamber 1 with the use of a vacuum pump 20 (or compressor). The recirculatory supply line 12 is connected to the exhaust gas line 11 to recirculate the gas into the vacuum chamber 1. The supply line branch 12A branches from the recirculatory supply line 12 to send a portion of the gas from the vacuum chamber into the vacuum chamber 1. The vacuum chamber 1 is provided with orifices 15 and 16 which are located in the top and bottom portions of the vacuum chamber, respectively. The orifice 15 is an intake orifice through which the gas which will become the ambient gas in the vacuum chamber is blown into the vacuum chamber. It is connected to the recirculatory supply line 12. The orifice 16 is an exhaust orifice through which the ambient gas in the vacuum chamber 1 is suctioned out or exhausted. It faces the orifice 15 across the vacuum chamber and is connected to the exhaust gas line 11. Further, the vacuum chamber 1 comprises an auxiliary intake orifice 17 through which a portion of the recirculating ambient gas from the vacuum chamber 1 is blown into the measurement light path of the laser interferometry device 7.

The exhaust gas line 11 is provided with the vacuum pump 20 such as a dry pump, a flow rate control valve 21, a controller 22, and a pressure sensor 23. The vacuum pump 20 suctions out the ambient gas in the vacuum chamber 1 through the exhaust orifice 16 located in the bottom portion of the vacuum chamber 1. The flow rate control valve 21 is rendered adjustable in opening angle, and is used to control the flow rate at which the gas is allowed to flow through the exhaust gas line 11. The pressure sensor 23 detects the internal pressure of the vacuum chamber 1. The controller 22 adjusts the opening angle of the flow rate control valve 21 based on the output of the sensor 23, so that a proper amount of the ambient gas in the vacuum chamber 1 is exhausted by the vacuum pump 20 to control the internal pressure of the vacuum chamber 1.

The recirculatory supply line 12 is provided with a tank 26, a flow rate control portion 27, and a temperature control unit 28, and is connected to the intake orifice 15 within the vacuum chamber 1. The tank 26 stores the gas exhausted and compressed by the vacuum pump 20. It suppresses the pressure fluctuation caused by the pulsing or the like of the vacuum pump 20, and also functions as a buffer so that even if the amount of the gas which flows into the tank 26 through the flow rate control valve 21 and the vacuum pump 20 reduces, the flow rate at which the gas is sent into the vacuum chamber 1 is kept constant. The temperature control unit 28 controls the gas temperature. The flow rate control portion 27 is constituted of a mass flow controller, a conductance valve, or the like, and recirculates the gas, the temperature of which has been adjusted to a predetermined temperature by the temperature control unit 28, into the vacuum chamber 1 through the intake orifice 15, at a predetermined flow rate. The supply line branch 12A branches from the recirculatory supply line 12 and is connected to the exhaust orifice 17. The gas which flows through the recirculatory supply line 12 is partially diverted into this recirculatory supply line branch 12A, and then is blown into the measurement light path of the laser interferometry based measuring device 7 through the auxiliary intake orifice 17.

The operation of the above described system which controls the vacuum environment in the vacuum chamber 1 is as follows. The vacuum pump 20 suctions out the ambient gas, such as helium gas, in the vacuum chamber 1 through the exhaust orifice 16. More specifically, the controller 22 adjusts the opening angle of the flow rate control valve 21 in response to the internal pressure of the vacuum chamber 1 detected by the pressure sensor 23, controlling thereby the amount by which the ambient gas in the vacuum chamber 1 is exhausted, so that the internal pressure of the vacuum chamber 1 is kept constant at a predetermined pressure (for example, 20,000 Pa). The gas exhausted from the vacuum chamber 1 by the vacuum pump 20, and compressed to an approximate pressure of 102,000 Pa by the vacuum pump 20, is stored in the tank 26 connected into the recirculatory supply line. The flow rate control portion 27 keeps constant (for example, 500 SLM) the rate at which the gas is allowed to flow through the recirculatory supply line 12, so that the gas is blown into the vacuum chamber 1 at a predetermined rate through the intake orifice 15.

The gas blown into the vacuum chamber through the intake orifice 15 flows downward toward the exhaust orifice 16 from the top portion of the vacuum chamber 1 along the substrate 2, mask 5, positioning stage 4, and the like, in the vacuum chamber 1. This downward gas flow is substantially parallel to the surfaces of the substrate 12 and mask 5. The heat generated by the heat sources, such as the driving means and electrical wiring for the positioning stage in the vacuum chamber 1, can be satisfactorily dissipated by this downward flow of the ambient gas in the vacuum chamber 1, and then, is moved out of the vacuum chamber as the ambient gas is exhausted. Consequently, the environment in the vacuum chamber 1 remains stable, preventing the mask 5 and substrate 2 from being incorrectly placed due to heat. Therefore, the substrate 2 is precisely exposed.

The recirculatory supply line branch 12A is configured so that the gas, the temperature of which has been adjusted to a predetermined temperature, can be blown into the measurement light path of the laser interferometry based measuring device 7 at a velocity of no less than 1 m/sec. With this arrangement, even if the ambient gas adjacent to the heat sources, that is, the driving means and electrical wiring for the positioning stage 4, and the like, in the vacuum chamber 1 is warmed up by the heat sources, the warmed ambient gas is kept away from the light path of the laser interferometry based measuring device 7 by the gas locally blown into the vacuum chamber 1 at a velocity substantially greater than the velocity at which the warmed gas rises. Therefore, the ambient gas in the measurement light path of the laser interferometry based measuring device is prevented from becoming turbulent. In other words, the state of ambient gas in the light path is kept constant, eliminating the possibility of the heat related measurement error. As a result, the position of the positioning stage 4 is accurately measured.

From the viewpoint of the effect upon the circuit pattern, external deformation of the wafer surface, and the like, it is important that the gas to be blown into the adjacencies of the measurement light path of the laser interferometry based device and the wafer does not contain any particles. Therefore, the intake orifice 15 and the auxiliary intake orifice 17 are fitted with an ULPA filter (unillustrated) to remove the particles in the gas.

When a vacuum pump, rather than a fan, is employed in the system for controlling the state of the environment in the vacuum chamber 1, the pressure difference created between the upstream and downstream sides of the vacuum pump when the vacuum pump is in operation is greater by several digits than the pressure difference created between the upstream and downstream sides of a fan. Thus, even if the vacuum pump, a vibration source, is placed far enough away from the vacuum chamber to isolate the vacuum chamber from the vibration, the gas can be flowed through the vacuum chamber at a sufficient velocity, and obviously, unlike the fan of a conventional air conditioner, the vacuum pump, being placed away from the vacuum chamber, does not vibrate the apparatuses and stages in the chamber.

The tube, or pipe, of the plumbing, through which the gas is blown into a specific local area of the vacuum chamber to cool the area and remove particles from the area, is long and narrow. Further, in some cases, the size and length of plumbing pipe of the apparatus must be reduced to reduce the apparatus cost, and in other cases, they must be reduced due to the restriction arising from the reduction in the vacuum chamber size. Even in these cases in which the plumbing pipe is long and narrow, the employment of a vacuum pump can create the gas flow with a sufficient velocity in the vacuum chamber. Thus, a vacuum pump is compatible with a laser interferometry based measuring device, into the adjacencies of which the gas must be blown at a velocity no less than 1 m/sec. Further, a vacuum pump, along with the flow rate control portion, makes it possible to keep constant the rate at which the gas flows through the system, and therefor, the rate at which the gas is blown into the beam path of the laser interferometry based measuring device does not fluctture, which in turn reduces measurement error. Also, the vacuum pump is suitable for blowing the gas into the wafer conveyance path to prevent particles from adhering to a wafer.

Next, another embodiment of the processing apparatus in accordance with the present invention will be described with reference to FIG. 2. FIG. 2 is a schematic view of another embodiment the processing apparatus, that is, a semiconductor exposing apparatus, in accordance with the present invention. In this embodiment, the components identical to those in the preceding embodiment are given the identical referential characters, and their detailed descriptions are omitted here.

The aforementioned ULPA filter employed in the preceding embodiment can remove the particles in the gas, but cannot remove the substances such as ammonium sulfate produced through chemical reaction triggered in the ambient gas by the exposure light. These substances adhere to the mask or the like, causing the exposure energy to attenuate, reducing thereby the throughput as well as making the exposure light nonuniform, which in turn makes the line width of the pattern on the wafer nonuniform. Thus, in order to remove the substances such as ammonium sulfate produced through the chemical reaction among the elements in the ambient gas, the gas recirculation path is desired to be provided with a chemical filter. A chemical filter is composed of a mixture of activated charcoal particles and pertinent chemicals. It removes microscopic amounts of unwanted gases by absorbing them not only physically, but also chemically. However, if it is placed in an environment in which the ambient pressure is below the atmospheric pressure, the chemicals which are parts of a chemical filter are sometimes caused to evaporate, which deteriorates its ability to remove the unwanted gases. Therefore, the location at which a chemical filter is placed in the gas recirculating path is desired to be where the ambient pressure is approximately the same or higher than the atmospheric air pressure.

Thus, in this embodiment, a chemical filter 29 is placed at a location between the temperature control unit 28 and the flow rate control unit 27, being on the downstream side of the temperature control unit 28 as shown in FIG. 2. In other words, it is placed at a location where the pressure of the ambient gas, which had reached a pressure (for example, 102,000 Pa) slightly higher than the atmospheric air pressure as the ambient gas was compressed while being exhausted from the vacuum chamber 1, has come down to a pressure (for example, 101,330 Pa) approximately the same as the atmospheric air pressure, due to the pressure loss which occurred to the gas while the gas was flowed through the pipes and the temperature control unit 28. Alternatively, it is possible to provide the recirculatory path with an additional pressure control valve or orifice dedicated to reducing the pressure of the ambient gas to a pressure substantially equal to the atmospheric air pressure, and place a chemical filter on the downstream side of this additional pressure control valve or orifice.

By placing a chemical filter at a location in the recirculatory path where the ambient gas pressure becomes approximately the same as the atmospheric air pressure, the substance produced through the chemical reaction among the elements in the ambient gas can be removed without deteriorating the chemical filter performance. Therefore, the attenuation of exposure light energy does not occur, and therefore, exposure light does not become nonuniform. Consequently, accurate exposure is possible.

Next, referring to FIG. 3, another embodiment of the processing apparatus in accordance with the present invention will be described. FIG. 3 is a schematic view of an embodiment of the processing apparatus in the form of a measuring apparatus for a processing apparatus in accordance with the present invention. Also in this embodiment, the components identical to those in the preceding embodiments will be given referential characters identical to those in the preceding embodiments, and their detailed descriptions will be omitted here.

This embodiment relates to an apparatus to be placed in the vacuum chamber 1 to measure the distances among the components and the amounts of the shifting of the components. The vacuum chamber 1 is filled with helium gas or the like, as the vacuum chamber 1 in the preceding embodiments was. The internal pressure of this vacuum chamber 1 is one fifth the atmospheric air pressure. Also, a laser interferometry based measuring device 47 and an object to be measure are placed in the vacuum chamber 1. The vacuum chamber 1 is provided with orifices 15 and 16 which are located in the top and bottom portions of the vacuum chamber, respectively. The orifice 15 is an intake orifice through which the gas which will become the ambient gas in the vacuum chamber is blown into the vacuum chamber. It is connected to a recirculatory supply line 12. The orifice 16 is an exhaust orifice through which the ambient gas in the vacuum chamber 1 is suctioned out. It faces the orifice 15 across the vacuum chamber, and is connected to an exhaust gas line 11. The gas blown into the vacuum chamber 1 through the intake orifice 15 flows downward toward the exhaust orifice 16 across the path of a laser beam 49. The exhaust gas line 11 and recirculatory supply line 12 for recirculating the ambient gas in the vacuum chamber 1 comprises a compressor (or vacuum pump) 50, a tank 26, a temperature control unit 28, a chemical filter 29, and a flow rate control portion 27. The compressor 50 sends the gas, the pressure of which has been reduced to approximately one fifth the atmospheric air pressure, into the tank 26 by increasing the gas pressure to a pressure equal to or greater than the atmospheric air pressure. The temperature control unit 28 keeps the gas temperature at 23° C.±0.1° C. The chemical filter 29 removes oil, ammonia, sulfuric acid ions, nitric acid ions, and the like from the gas as the gas, the pressure and temperature of which have been adjusted by the compressor and the temperature control unit 28, is passed through the filter 29. The flow rate control portion 27 controls the gas flow so that the gas is recirculated into the vacuum chamber 1 at a predetermined rate.

The laser interferometry based measuring device 47 is operated in the ambient gas, or helium gas, the pressure of which has been reduced to approximately one fifth the atmospheric air pressure as described above. When the laser interferometry based measuring device 47 is operated, that is, when the position of the object 48 is measured by projecting a laser beam 49 onto the object 48, in the above described environment, the measurement error traceable to temperature fluctuation is approximately ¹⁄₄₀ the measuring error which occurs when the position of the object 48 is measured in an environment, in which the ambient pressure is equal to the atmospheric air pressure. In other words, the position of the object 48 is measured with much higher accuracy. Further, placing the chemical filter 29 at a location where the pressure of the ambient gas has been increased by the compressor 50 or the like allows the chemical filter to function without losing its performance.

Figure 4:
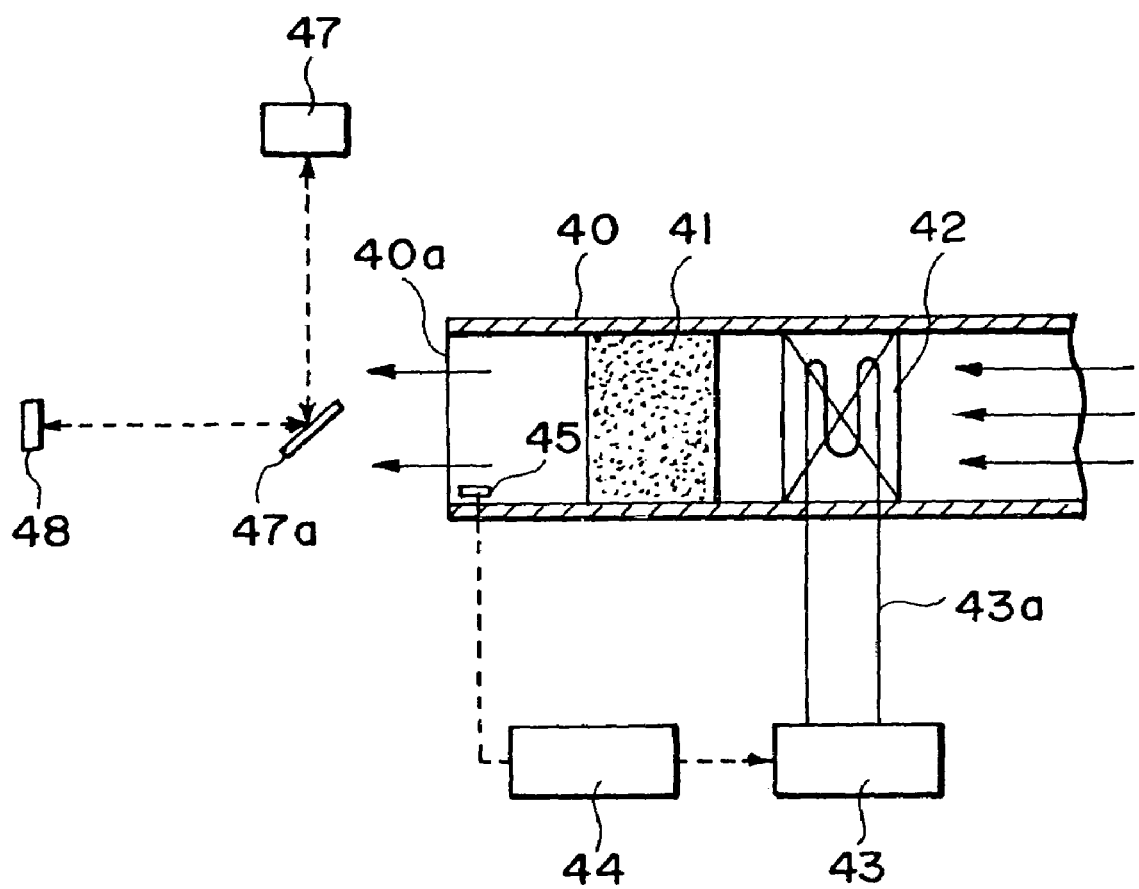
FIG. 4 is a schematic view of the gas temperature controlling device which keeps constant the temperature of the gas blown into the distance measuring path of the laser interferometry based measuring device in a processing apparatus in accordance with the present invention.

Next, referring to FIG. 4, another embodiment of the processing apparatus in accordance with the present invention will be described. FIG. 4 is a schematic view of a gas temperature controlling means which keeps constant the temperature of the gas ready to be blown into the measurement light path, and its adjacencies, of a laser interferometry based measuring device.

In FIG. 4, the gas temperature controlling means comprises a gas temperature controlling portion 42, a gas temperature control water circulating apparatus 43, a pipe 43a, a gas temperature control water temperature control portion 44, and a temperature sensor 45. The gas temperature controlling portion 42, which adjusts the gas temperature, is disposed in the pipe 40 leading to the intake orifice, on the upstream side of a particle catching filter 41 which also is disposed in the pipe 40. The pipe 43a leading from the gas temperature control water circulating apparatus 43 is run through the gas temperature controlling portion 42. After the temperature of the gas temperature controlling water is adjusted by the gas temperature controlling water circulating apparatus, the water is circulated through the gas temperature controlling portion 42, so that the temperature of the gas is adjusted while the gas is flowing through the gas temperature controlling portion 42. The temperature sensor 45 for measuring the temperature of the gas which is flowing through the end portion 40a of the pipe 40 is disposed adjacent to the end portion 40a. The gas temperature controlling water temperature control portion 44 controls the gas temperature controlling water circulating apparatus 43 in response to the gas temperature detected by the temperature sensor 45, so that the gas temperature controlling water with a predetermined temperature is circulated through the gas temperature controlling portion 42 at a predetermined flow rate, and the gas temperature is controlled to remain at a predetermined temperature while the gas is passing through the gas temperature controlling portion. In other words, the temperature of the gas ready to be blown into the vacuum chamber is measure by the temperature sensor 45, and is maintained at a predetermined temperature (normal temperature) by controlling the gas temperature control portion 42 by the gas temperature controlling water temperature control portion 44 in response to the results of the measurement by the temperature sensor 45. With this arrangement, the temperature of the gas blown into the measurement light path of an interferometry based measuring device, and also into the adjacencies of the mask and wafer, can be maintained at a predetermined temperature (normal temperature). Further, in FIG. 4, referential characters 47 and 47a designate a laser interferometry based measuring device and a beam splitter prism, respectively. A referential character 48 designates an object such as a mirror, the position of which is measured. The object to be measured is held on a positioning stage or the like.

With the arrangements described above, the gas temperature at the point where the gas is blown from the intake orifice into the vacuum chamber can be kept constant at a predetermined temperature (normal temperature). In other words, it is not affected by the pressure loss which occurs as the gas is flowed through a filter at a high velocity, the pressure loss which occurs as the gas flows through pipes, and the fluctuation of the temperature of the pipe, which is caused by the ambient temperature around the pipe. Further, by blowing the temperature controlled gas into a local area, or the measurement light path of the interferometry measuring device, at a high velocity prevents gas turbulence, which in turn reduces measurement error. Consequently, the accuracy of the interferometry based measuring device can be improved, which in turn improves the accuracy in aligning the substrate with the mask.

In this embodiment, the gas is blown into a local area, or the measurement light path of the interferometry based measuring device as described above. However, the location into which the gas is blown does not need to be limited to the measurement light path of the interferometry based measuring device. The gas may be blown into various other locations, for example, the adjacencies of the mask and wafer, which is obvious.

Figure 5:
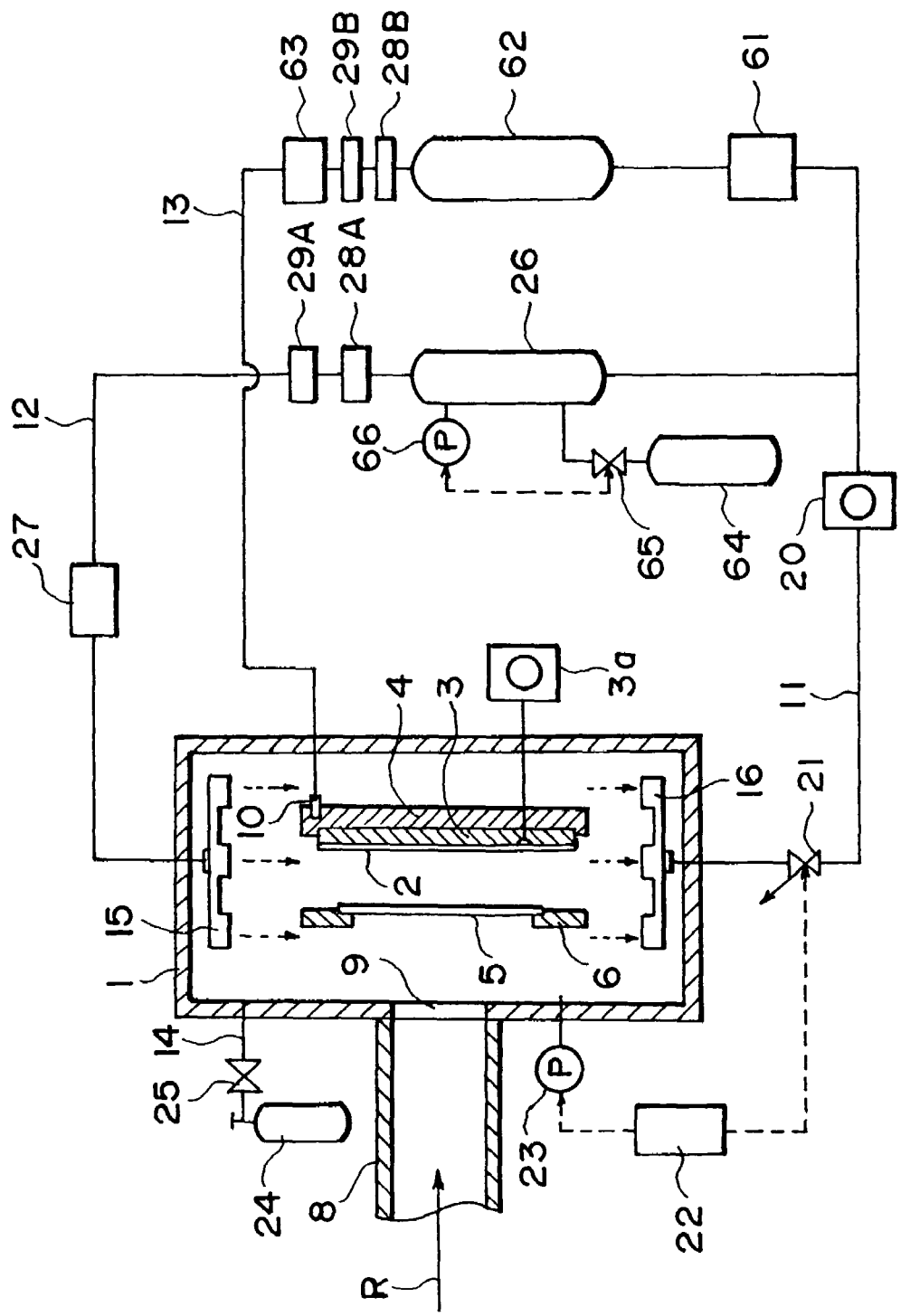
FIG. 5 is a schematic view of another embodiment of the present invention in the form of a processing apparatus, that is, a semiconductor exposing apparatus.

Next, referring to FIG. 5, another embodiment of the processing apparatus in accordance with the present invention will be described. FIG. 5 is a schematic view of a semiconductor exposing apparatus in accordance with the present invention. In this embodiment of the present invention, the pressure loss which occurs in the vacuum chamber and the ambient gas recirculating system is compensated for. In FIG. 5, the components identical to those in the preceding embodiments illustrated in FIGS. 1 and 2 are given referential characters identical to those in the preceding embodiments.

The semiconductor exposing apparatus in FIG. 5 comprises, like the one in the embodiment illustrated in FIG. 1, a vacuum chamber 1, a positioning stage 4, a mask holding apparatus 6, a beam duct 8, and a beryllium window 9. The positioning apparatus 4 comprises a suction chuck 3 for holding, by suction, a substrate 2 in the vacuum chamber 2. The mask holding apparatus 6 holds a mask 5. The beam duct 8 is guiding duct. In operation, the internal space of the beam duct 8 is kept in an extremely high vacuum state, and an X-ray R emitted from a synchrotron, or the like X-ray source (unillustrated), of an exposing means is guided into the vacuum chamber 1 through the beam duct 8. The beryllium window 9 separates the environment in the vacuum chamber 1 from the extremely vacuum environment in the beam duct 8. The vacuum chamber 1 contains a plurality of static pressure bearings 10 (only one of them is illustrated in FIG. 5) in addition to the mask holding apparatus and positioning stage 4. The static pressure bearing 10 is used as the guiding mechanism for highly precisely positioning the mask holding apparatus 6 and positioning stage in the vacuum chamber 1. Normally, air is used as the operational fluid for the static pressure bearing 10, but in this embodiment, helium gas or the like which is used as the ambient gas in the vacuum chamber 1 is employed. The static pressure bearing 10 is connected to high pressure gas supplying line 13, and the operational fluid, or helium or the like gas, is used in a highly compressed state. The high pressure gas supplying line 13 will be described later. The suction chuck 3 of the positioning stage 4 is connected to a vacuum pump 3a located outside the vacuum chamber 1. The substrate 2 is held to the suction chuck 3 by the vacuum generated by the operation of the vacuum pump 3a. As is evident from the above description, the semiconductor exposing apparatus in this embodiment is structured so that the X-ray R guided into the vacuum chamber 1 through the beryllium window 9 by the beam duct 8 transfers the pattern created by the mask 5 held by the mask holding apparatus 6 onto the substrate 2 held to the positioning stage 4 through the suction chuck 3.

The system for controlling the internal low pressure ambience of the vacuum chamber comprises an exhaust gas line 11, a recirculatory supply line 12, a high pressure gas supply line 13, and a constant flow rate supply line 14. The exhaust gas line 11 controls the internal pressure (degree of vacuum) of the vacuum chamber 1 by exhausting the ambient gas such as helium gas in the vacuum chamber 1 with the use of a vacuum pump 20. The recirculatory supply line 12 is connected into the exhaust gas line 11 to recirculate the gas into the vacuum chamber 1. The high pressure gas supply line 13 is a gas supply line through which the gas from the vacuum chamber 1 is supplied, in the highly compressed state, to the plurality of the static pressure bearings 10 for the positioning stage 4 or the like. The constant gas supply line 14 is a gas supply line through which very pure gas which will become the ambient gas of the vacuum chamber 1 is flowed into the vacuum chamber 1 at a predetermined constant flow rate. The vacuum chamber 1 is provided with orifices 15 and 16 which are located in the top and bottom portions of the vacuum chamber 1, respectively. The orifice 15 is an intake orifice through which the recirculated ambient gas from the vacuum chamber 1 is blown into the vacuum chamber 1. It is connected into the recirculating supply line 12. The orifice 16 is an exhaust orifice through which the ambient gas in the vacuum chamber 1 is suctioned out, or exhausted. It faces the orifice 15 across the vacuum chamber 1, and is connected to the exhaust gas line 11. The exhaust gas line 11 and the recirculating supply line 12 are structured as those in the embodiment illustrated in FIG. 1. In other words, the exhaust gas line 11 is provided with the vacuum pump 20 such as a dry pump, a flow rate control valve 21, a controller 22, and a pressure sensor 23. The vacuum pump 20 suctions out the ambient gas in the vacuum chamber 1 through the exhaust orifice 16 located in the bottom portion of the vacuum chamber 1. The flow rate control valve 21 is rendered adjustable in opening angle, and is used to control the rate at which the gas is allowed to flow through the exhaust gas line 11. The pressure sensor 23 detects the internal pressure of the vacuum chamber 1. The controller 22 adjusted the opening angle of the flow rate control valve 21 based on the output of the sensor 23, so that the ambient gas in the vacuum chamber 1 is exhausted at a proper flow rate by the vacuum pump 20 to control the internal pressure of the vacuum chamber 1.

The recirculatory supply line 12 is provided with a tank 26, a flow rate control portion 27, and a temperature control unit 28, and is connected to the intake orifice 15 within the vacuum chamber 1. The tank 26 stores the gas exhausted and compressed by the vacuum pump 20. It suppresses the pressure fluctuation caused by the pulsing or the like of the vacuum pump 20, and also functions as a buffer so that even if the flow rate at which the gas flows into the tank 26 through the flow rate control valve 21 and the vacuum pump 20 reduces, the flow rate at which the gas is sent into the vacuum chamber 1 is kept constant. The temperature control unit 28 controls the gas temperature. The flow rate control portion 27 is constituted of a mass flow controller, a conductance valve, or the like, and recirculates the gas, the temperature of which has been adjusted to a predetermined temperature by the temperature control unit 28, into the vacuum chamber 1 through the intake orifice 15, at a predetermined flow rate. A chemical filter 29A is disposed between the temperature control unit 28 and the flow rate control portion 27, being on the downstream side of the temperature control unit 28.

The high pressure gas supply line 13 is provided with a compressor 61, a high pressure tank 26, a regulator 63 and a temperature control unit 28B. The compressor 61 further comprises the gas exhausted and compressed by the vacuum pump 20 so that the gas pressure increases to a predetermined level. The high pressure tank 62 stores the gas compressed by the compressor 61. The regulator 63 releases the high pressure gas stored in the high pressure tank 62, while allowing the highly compressed gas to slightly decompress, so that the static pressure bearings 10 of the positioning stage and the like are supplied with the slightly decompressed gas at a constant flow rate. The temperature control unit 28B controls the gas temperature. The chemical filter 29B is disposed between the temperature control unit 28B and the regulator 63, that is, on the downstream side of the temperature control unit 28B. The constant rate gas supply line 14 is provided with a cylinder 24 filled with very pure gas, and a control valve 25. It supplies the vacuum chamber 1 with gas such as helium or the like which will become the ambient gas in the vacuum chamber 1, at a constant flow rate (for example, 0.8 SLM), to compensate for the air leak into the sealed vacuum chamber 1.

The tank 26 of the recirculatory supply line 12 is provided with a pressure sensor 66, and is connected to a cylinder 64 through a control valve 65. The pressure sensor 66 detects the internal pressure of the tank 26, and the cylinder 64 stores the gas and functions as a gas supply source. The gas in the cylinder 64 is released into the tank 26 through the control valve 65 which is opened or closed in response to the internal temperature of the tank 26 detected by the pressure sensor 68.

In this embodiment, the system for controlling the ambient gas in the vacuum chamber works in the following manner. The vacuum pump 20 such as a dry pump suctions out, or exhausts, the ambient gas such as helium gas in the vacuum chamber 1 through the exhaust orifice 16 and the flow rate control valve 21. As the gas is suctioned out, or exhausted, by the vacuum pump 20, the flow rate control valve 21 is controlled by the controller 22 in response to the internal pressure of the vacuum chamber 1 detected by the pressure sensor 23, so that the internal pressure of the vacuum chamber 1 remains at a predetermined pressure (for example, 20,000 Pa). The gas exhausted by the vacuum pump 20 is compressed by the vacuum pump 20 so that the gas pressure reaches approximately 102,000 Pa. Then, the compressed gas is stored in the tank 26 of the recirculatory supply line 12. The flow rate control portion 27 of the recirculatory supply line 12 allows the gas stored in the tank 26 to be recirculated or blown, into the vacuum chamber 1 at a virtually constant flow rate (for example, 300 SLM+α).

The gas blown into the vacuum chamber 1 through the intake orifice 15 flows downward toward the exhaust orifice 16 from the top portion of the vacuum chamber 1, along the substrate 2, mask 5, positioning stage 4, and the like, of the exposing apparatus in the vacuum chamber 1. The heat generated by the heat source, such as the driving means and electrical wiring for the positioning stage in the vacuum chamber 1 can be satisfactorily removed, or dissipated, by this downward flow of the ambient gas in the vacuum chamber 1. Consequently, the mask 5 and substrate 2 are prevented from being incorrectly placed due to heat. Therefore, accurate exposure is possible.

The constant flow rate supply line 14 prevents the purity of the ambient gas in the vacuum chamber 1 from being reduced by the air leak into the vacuum chamber 1. More specifically, very pure ambience gas for the vacuum chamber 1 is supplied into the vacuum chamber 1 from the cylinder 24 through the control valve 25 at a constant flow rate (for example, 0.8 SLM) which is adjustable by controlling the opening angle of the control valve 25.

As for the high pressure gas for the static pressure bearings 10 for the substrate positioning stage, mask holding apparatus, and the like, the gas suctioned out from the vacuum chamber 1 into the recirculatory supply line 12 by the vacuum pump 20 is supplied to the static pressure bearings 10 through a high pressure gas supply line 13 which branches from the recirculatory supply line 12. The gas from the recirculatory supply line 12 is compressed by the compressor 61 so that its pressure reaches a predetermined level (6 kgf/cm$^2$), and is stored in the high pressure tank 62 of the high pressure gas supply line 13. Then, the gas stored in the high pressure tank 62 is fed to the static pressure bearings 10 at a constant flow rate (for example, 10 SLM) after being allowed to decompress by the regulator 63 so that is pressure comes down (from 6 kgf/cm$^2$) to approximately 6 kgf/cm$^2$. With this arrangement, the positioning stage 4 and the like are highly precisely positioned by the high pressure gas supplied to the static pressure bearings 10 of the positioning stage 4 and the like. Further, the attenuation of the exposing light can be reduced without concern about the contamination of the ambient gas in the vacuum chamber 1. In addition, even if the internal pressure of the vacuum chamber 1 is slightly increased by a small amount of the high pressure gas which leaks from the static pressure bearing 10, the internal pressure of the vacuum chamber 1 remains constant at a predetermined pressure. More specifically, the pressure increase in the vacuum chamber 1 is detected by the pressure sensor 23, and the flow rate control valve 21 is adjusted in response to the pressure detected by the pressure sensor 23. Then, a pertinent amount of the ambient gas in the vacuum chamber 1 is suctioned out by the vacuum pump 20 to keep the internal pressure of the vacuum chamber 1 constant at a predetermined level (for example, 20,000 Pa).

The tank 26 is connected to the cylinder 64 as the source for the ambient gas for the vacuum chamber 1, through the control valve 65 which opens or closes in response to the results of the measurement by the pressure sensor 66. The control valve 65 is structured so that it opens as the internal pressure of the tank 26 falls below, for example, 0.8 kgf/cm$^2$, and closes as the internal pressure of the tank 26 rises above, for example, 1.0 kgf/cm$^2$. In other words, as the internal pressure of the tank 26 measured by the pressure sensor 66 falls below 0.8 kgf/cm$^2$, the control valve 65 opens to allow the gas to flow from the cylinder 64 into the tank 26, and as the internal pressure of the tank 26 rises above 1.0 kgf/cm$^2$, the control valve 65 closes to stop the gas supply. With this arrangement, as the internal pressure of the tank 26 decreases, the gas is supplied, as necessary, from the cylinder 64 to the tank 26 so that the loss of the internal pressure of the tank 26 is compensated by the new gas supply.

As described before, the positioning stage 4 is disposed within the vacuum chamber 1, and the substrate 2 is held to the suction chuck 3 of the stage 4 by the suction generated by the vacuum pump 3a. Therefore, the ambient gas in the vacuum chamber 1 is suctioned out of the vacuum chamber 1, temporarily reducing the internal pressure of the vacuum chamber 1, each time the vacuum pump 3a is operated to maintain the suction which is holding the substrate 2 to the suction chuck 3. As this process is repeated for a long period of time, the overall amount of the ambient gas suctioned out of the vacuum chamber 1 becomes too large to be compensated for by only the ambient gas for the vacuum chamber 1 supplied through the constant flow rate supply line 14 for compensating for the air leak into the vacuum chamber 1. Further, the tank 26 fails to function as the buffer for controlling the flow rate of the gas which is being recirculated toward the vacuum chamber 1. Thus, the internal pressure of the vacuum chamber 1 gradually decreases. As the internal pressure of the vacuum chamber 1 decreases, and the amount of the gas recirculating through the recirculatory supply line 12 also decreases as described above, it becomes impossible for the internal pressure of the vacuum chamber 1 to be maintained at the predetermined pressure. In this embodiment, however, as the internal pressure of the tank 26 decreases, a fresh supply of the ambient gas for the vacuum chamber 1 is supplied to the tank 26 from the cylinder 64, and then is supplied from the tank 26 to the vacuum chamber 1 through the recirculatory supply line 12 at the predetermined flow rate. Therefore, the internal pressure of the vacuum chamber 1 is prevented from decreasing below the predetermined pressure. In other words, this embodiment improves the accuracy with which the internal pressure of the vacuum chamber 1 is controlled, reducing the amount of the attenuation of the exposure light such as X-ray or the like, which in turn prevents nonuniform exposure, making extremely precise exposure possible.

Illustrated in FIG. 6 is a means different from the above described one for more precisely maintaining the internal pressure of the tank 26 with which the recirculatory supply line 12 is provided. In FIG. 6, a tank 26 is connected to a cylinder 65 as a gas supply source for the vacuum chamber 1, through a control valve 64 which is controlled to open or close in response to the results of the measurement by a pressure sensor 66. The tank 26 is also connected to an exhaust pump 67, which suctions the gas from the tank 26 through a control valve 68 controlled to open or close in response to the results of the measurement by the pressure sensor 66. The control valve 65 is structured to open as the internal pressure of the tank 26 decreases below, for example, 1.0 kgf/cm$^2$, and to close as the internal pressure of the tank 26 increases beyond, for example, 1.0 kgf/cm$^2$, whereas the control valve 68 is structure to open as the internal pressure of the tank 26 increases beyond, for example, 1.0 kgf/cm$^2$, and to close as the internal pressure of the tank 26 decreases below, for example, 1.0 kgf/cm$^2$. In other words, as the internal pressure of the tank 26 measured by the pressure sensor 66 decreases below 1.0 kgfcm$^2$, the control valve 65 is opened to supply the gas from the cylinder 64 to the tank 26 restoring the internal pressure of the tank 26 to 1.0 kg Vcm$^2$. On the contrary, as the internal pressure of the tank 26 increases beyond 1.0 kgf/cm$^2$ the control valve 65 is closed, and the control valve 68 is opened, to suck the gas from the tank 26 by the exhaust pump 67, restoring the internal pressure of the tank 26 to 1.0 kgf/cm$^2$. Connecting the tank 26 to the gas supply cylinder 64 and the gas exhaust pump 67 through the control valves 65 and 68, respectively, makes it possible to keep constant the internal pressure of the tank 26, facilitating the control operation of the flow rate control portion 27 of the recirculatory supply line 12. Consequently, the flow rate at which the ambience gas for the vacuum chamber 1 is caused to flow into the vacuum chamber 1 is more precisely maintained. In other words, the system illustrated in FIG. 6 more effectively prevents the pressure decrease in the vacuum chamber 1. In other words, it improves the accuracy with which the internal pressure of the vacuum chamber 1 is controlled.

Figure 7:
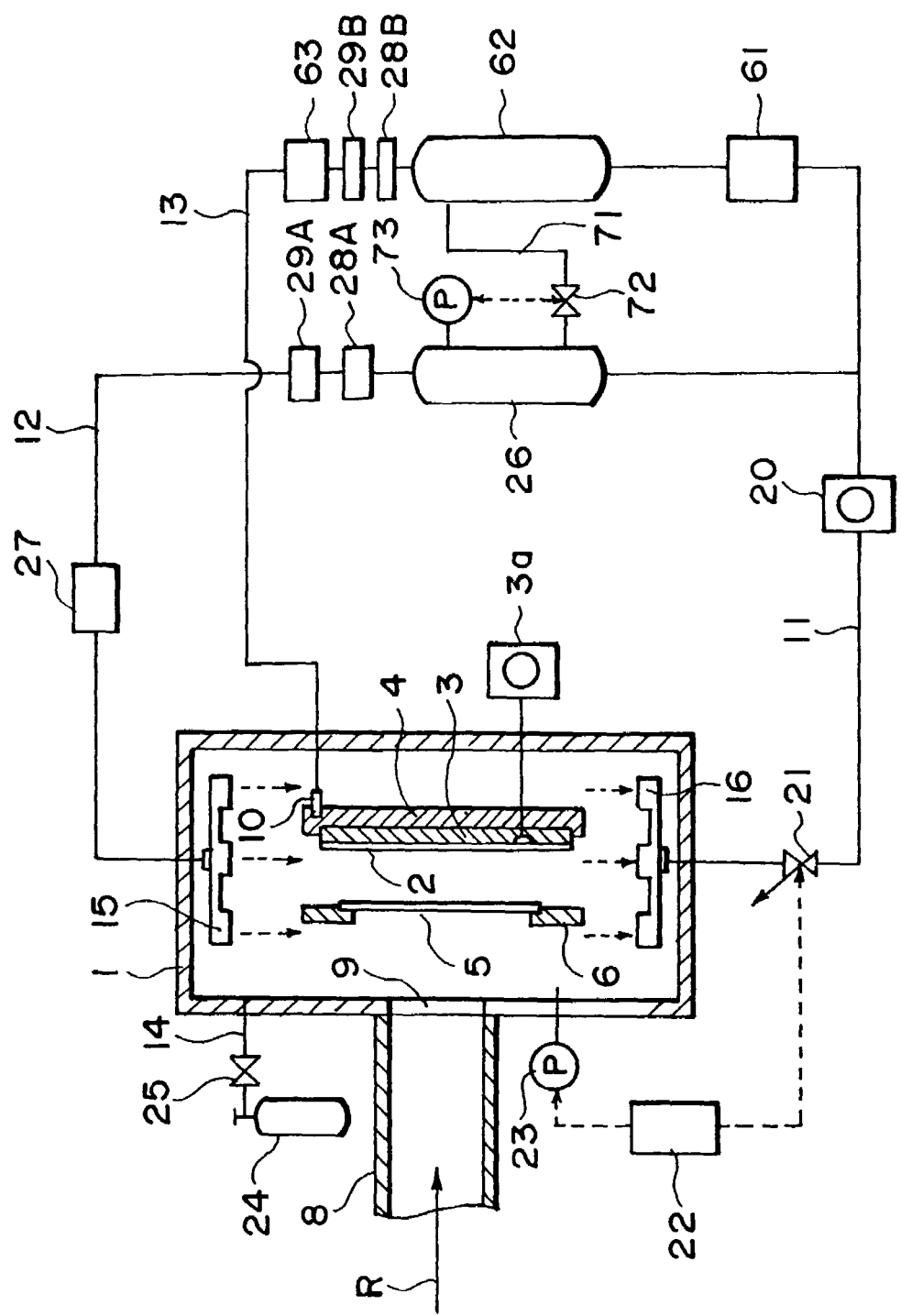
FIG. 7 is a schematic view of another embodiment of the present invention in the form of a processing apparatus, that is, an exposing apparatus.

Next, referring to FIG. 7, another embodiment of the processing apparatus in accordance with the present invention will be described. Also in this embodiment, the components identical to those in the preceding embodiment illustrated in FIG. 5 are given referential characters identical to those in FIG. 5, and their detailed descriptions will be omitted here.

This embodiment is different from the embodiment illustrated in FIG. 5 in that high pressure gas is supplied to the tank 26 of a recirculatory supply line 12 from the high pressure tank 62 of a high pressure gas supply line 13. More specifically, the tank 26 of the recirculatory supply line 12 and the high pressure tank 62 of the high pressure gas supply line 13 are connected to each other by a pipe 71 provided with a control valve 72. The control valve 72 is controlled in response to the results of the measurement of a pressure sensor 73 which measures the internal pressure of the tank 26. The control valve 72 is structured to open as the internal pressure of the tank 26 decreases below, for example, 0.8 kgf/cm$^2$, and to close as the internal pressure of the tank 26 increases beyond, for example, 1.0 kgf/cm$^2$. In other words, as the internal pressure of the tank 26 measured by the pressure sensor 73 decreases below 0.8 kgf/cm$^2$, the control valve 72 is opened to supply the gas from the high pressure tank 62 to the tank 26. On the contrary, as the internal pressure of the tank 26 increases beyond 1.0 kgf/cm$^2$, the control valve 72 is closed to stop supplying the tank 26 with the gas.

Thus, also in this embodiment, like the above described embodiment illustrated in FIG. 5, the ambient gas in the vacuum chamber 1 is suctioned out of the vacuum chamber 1, temporarily reducing the internal pressure of the vacuum chamber 1, each time the vacuum pump 3a is operated to maintain the suction which is holding the substrate 2 to the suction chuck 3. As this process is repeated for a long period of time, the internal pressure of the vacuum chamber 1 gradually decreases. In this embodiment, however, as the internal pressure of the tank 26 decreases below a predetermined value, high pressure gas is supplied to the tank 26 from the high pressure tank 62, keeping constant the flow rate at which the gas is recirculated into the vacuum chamber 1 through the recirculatory supply line 12. Therefore, the internal pressure of the vacuum chamber 1 is prevented from decreasing. In other words, this embodiment prevents the decrease in the internal pressure of the vacuum chamber 1, improving the accuracy with which the internal pressure of the vacuum chamber 1 is controlled.

Figure 8:
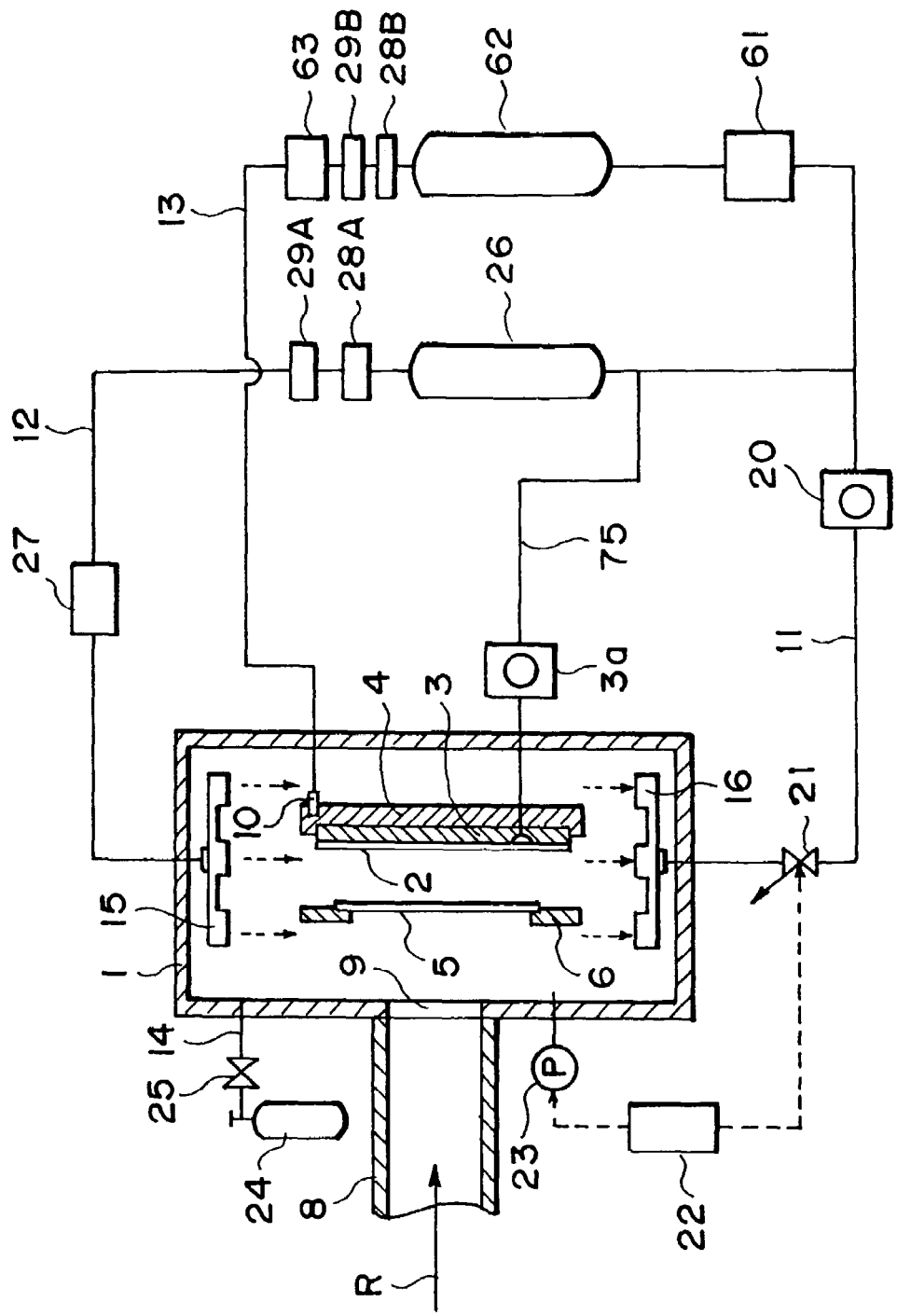
FIG. 8 is a schematic view of another embodiment of the present invention in the form of a processing apparatus, that is, an exposing apparatus.

Next, referring to FIG. 8, another embodiment of the processing apparatus in accordance with the present invention will be described. Also in this embodiment, the components identical to those in the preceding embodiment illustrated in FIGS. 5 and 7 are given referential characters identical to those in FIGS. 5 and 7, and their detailed descriptions will be omitted here.

This embodiment is characterized in that a vacuum pump 3a connected to a suction chuck 3 for holding a substrate 2 by suction is connected to the recirculatory supply line 12, on the upstream side of a tank 26, with the use of a pipe 75. Thus, the ambient gas in the vacuum chamber 1 suctioned out by the vacuum pump 3a as the vacuum pump 3a is operated to hold the substrate 2 to the suction chuck 3, is introduced into the recirculatory supply line 12 through the pipe 75. With this arrangement, the ambient gas in the vacuum chamber 1 suctioned out by the vacuum pump 3a, that is, the very gas which is one of the essential causes of the decreases in the internal pressure of the vacuum chamber 1, is directly introduced, through the pipe 75, into the recirculatory supply line 12, and then into the tank 26, increasing the flow rate at which the gas is circulated through the recirculatory supply line 12. In other words, this embodiment makes it possible to keep constant the amount of the ambient gas in the vacuum chamber 1 recirculated back into the vacuum chamber 1 through the recirculatory supply line 12, preventing the internal pressure of the vacuum chamber 1 from decreasing. Consequently, it improves the accuracy with which the internal pressure of the vacuum chamber 1 is controlled.

Next, referring to FIG. 9, another embodiment of the processing apparatus in accordance with the present invention will be described. FIG. 9 is a schematic view of another embodiment of the processing apparatus, or a semiconductor exposing apparatus, in accordance with the present invention. In this embodiment, when the processing apparatus is not in operation, the ambient gas in a vacuum chamber 1 is stored in the recirculatory system to reduce the consumption of the ambience gas for the vacuum chamber 1 so that the cost for running the processing apparatus is reduced. The components in this embodiment identical to those in the embodiments illustrated in FIGS. 1 and 5 are given referential characters identical to those in FIGS. 1 and 5, and their detailed descriptions will be omitted here.

In FIG. 9, like the embodiments illustrated in FIGS. 1 and 5, the semiconductor exposing apparatus in this embodiment comprises a vacuum chamber 1, a positioning stage 4, a mask holding apparatus 6, a beam duct 8, and a beryllium window 9. The positioning apparatus 4 comprises a suction chuck 3 for holding, by suction, a substrate 2, in the vacuum chamber 2. The mask holding apparatus 6 holds a mask 5. The beam duct 8 is a guiding duct. In operation, the internal space of the beam duct 8 is kept in an extremely high vacuum state, and an X-ray R emitted from a synchrotron, or the like an X-ray source (unillustrated), of an exposing means is guided into the vacuum chamber 1 through the beam duct 8. The beryllium window 9 separates the environment in the vacuum chamber 1 from the extremely high vacuum ambience in the beam duct 8. The vacuum chamber 1 contains a plurality of static pressure bearings 10 (only one of them is illustrated in FIG. 9) in addition to the mask holding apparatus and positioning stage 4. The static pressure bearing 10 is used as the guiding mechanism for highly precisely positioning the mask holding apparatus 6 and positioning stage in the vacuum chamber 1. Normally, air is used at the operational fluid for the static pressure bearing 10, but in this embodiment, helium gas or the like which is used as the ambient gas for the vacuum chamber 1 is employed. The static pressure bearing 10 is connected to a high pressure gas supplying line 13, and the operational fluid, or helium gas, or the like, is used in a highly compressed state. The suction chuck 3 of the positioning stage 4 is connected to a vacuum pump 3a located outside the vacuum chamber 1. The semiconductor exposing apparatus in this embodiment is structured so that the X-ray R guided into the vacuum chamber 1 through the beryllium window 9 by the beam duct 8 transfers the pattern created by the mask 5 held by the mask holding apparatus 6 onto the substrate 2 held to the positioning stage 4 through the suction chuck 3.

The system for controlling the internal low pressure ambience of the vacuum chamber 1 comprises an exhaust gas line 11, a recirculatory supply line 12, a high pressure gas supply line 13, and a constant flow rate supply line 14. The exhaust gas line 11 controls the internal pressure (degree of vacuum) of the vacuum chamber 1 by exhausting the ambient gas such as helium gas in the vacuum chamber 1 with the use of a vacuum pump 20. The recirculatory supply line 12 is connected into the exhaust gas line 11 to recirculated the exhausted gas into the vacuum chamber 1. The high pressure gas supply line 13 is a gas supply line through which the gas from the vacuum chamber 1 is supplied, in the highly compressed state, to the plurality of the static pressure bearings 10 for the positioning stage 4 or the like. The constant gas supply line 14 is a gas supply line through which very pure ambient gas for the vacuum chamber 1 is flowed into the vacuum chamber 1 at a predetermined constant flow rate. The vacuum chamber 1 is provided with orifices 15 and 16 which are located in the top and bottom portions of the vacuum chamber 1, respectively. The orifice 15 is an intake orifice through which the recirculated ambient gas from the vacuum chamber 1 is blown into the vacuum chamber 1. It is connected to the recirculatory supply line 12. The orifice 16 is an exhaust orifice through which the ambient gas in the vacuum chamber 1 is suctioned out. It faces the orifice 15 across the vacuum chamber 1, and is connected to the exhaust gas line 11.

The exhaust gas line 11, recirculating supply line 12, high pressure gas supply line 13, and constant flow rate supply line 14 in this embodiment are structured as those in the embodiment illustrated in FIG. 5. The vacuum pump 20 of the exhaust gas line 11 is open to the atmospheric air through a valve 81. The valve 81 is structured so that it normally remains closed. When it is closed, the gas suctioned out of the vacuum chamber 1 is sent through the recirculatory supply line 12, whereas when it is open, the ambient gas in the vacuum chamber 1 and the recirculatory supply line 12 is discharged into the atmospheric air. The recirculatory supply line 12 in this embodiment comprises a valve 82, which is normally keep open, and a pipe 83, through which high pressure nitrogen gas or high pressure air can be introduced into the recirculatory supply line 12. The valve 82 and pipe 83 are located on the downstream side of the tank 26. The high pressure gas supply line 13 is provided with valves 84 and 85. The valve 84 is located on the upstream side of a high pressure tank 62, and is normally kept open. The valve 85 is located on the downstream side of the high pressure tank 62, being between the high pressure tank 62 and a regulator 63, and is normally kept open. The intake orifice 15, recirculatory lines 12 and 13, and the like, may be fitted with an ULPA filter so that the particles contained in the ambient gas for the vacuum chamber 1 are removed as the gas is sent into the vacuum chamber 1.

In the above described system which controls the vacuum environment in the vacuum chamber 1, the vacuum pump 20 suctions out the ambient gas, such as helium gas, in the vacuum chamber 1 through the exhaust orifice 16. More specifically, a controller 22 adjusts the opening angle of a flow rate control valve 21 in response to the internal pressure of the vacuum chamber 1 detected by a pressure sensor 23, controlling thereby the amount by which the ambient gas in the vacuum chamber 1 is exhausted, so that the internal pressure of the vacuum chamber 1 is kept constant at a predetermined pressure (for example, 20,000 Pa). The gas exhausted from the vacuum chamber 1 by the vacuum pump 20 and then compressed to increase its pressure to approximately 102,000 Pa by the vacuum pump 20 is stored in the tank 26 of the recirculatory supply line 12. The flow rate control portion 27 of the recirculatory supply line 12 keeps constant (for example, 300 SLM+α) the flow rate at which the gas is allowed to flow through the recirculatory supply line 12, so that the gas is blown into the vacuum chamber 1 at a predetermined flow rate through the intake orifice 15.

The gas blown into the vacuum chamber 1 through the intake orifice 15 flows downward toward the exhaust orifice 16 from the top portion of the vacuum chamber 1 along the substrate 2, mask 5, positioning stage 4, and the like, in the vacuum chamber 1. The heat generated by the heat source, such as the driving means and electrical wiring for the positioning stage, in the vacuum chamber 1 can be satisfactorily removed, or dissipated, by this downward flow of the ambient gas in the vacuum chamber 1. Consequently, the mask 5 and substrate 2 are prevented from being incorrectly placed due to heat. Therefore, accurate exposure is possible. The constant flow rate supply line 14 is provided with a control valve 25. It is a gas supply line through which highly pure ambient gas for the vacuum chamber 1 is supplied from a gas cylinder 24 to the vacuum chamber 1 to prevent the purity of the ambient gas in the vacuum chamber 1 from being decreased by the air leak into the vacuum chamber 1. More specifically, the opening angle of the valve 25 is controlled so that the ambient gas for the vacuum chamber 1 is supplied to the vacuum chamber 1 at a constant flow rate (for example, 0.8 SLM).

As for the high pressure gas for the static pressure bearings 10 for the substrate positioning stage, mask holding apparatus, and the like, the gas suctioned out from the vacuum chamber 1 into the recirculatory supply line 12 by the vacuum pump 20 is supplied to the static pressure bearings 10 through a high pressure gas supply line 13 which branches from the recirculatory supply line 12. The gas from the recirculatory supply line 12 is compressed by the compressor 61 so that its pressure reaches a predetermined level (6 kgf/cm$^2$), and is stored in the high pressure tank 62 of the high pressure gas supply line 13. Then, the gas stored in the high pressure tank 62 is fed to the static pressure bearings 10 at a constant flow rate (for example, 10 SLM) after being allowed to decompress by the regulator 63 so that its pressure comes down (from 6 kgf/cm$^2$) to approximately 5 kgf/cm$^2$. At this point in time, the valves 84 and 85 are both kept open. With this arrangement, the positioning stage 4 and the like are highly precisely positioned by the high pressure gas supplied to the static pressure bearings 10 of the positioning stage 4 and the like. Further, the attenuation of the exposing light can be reduced without concern about the contamination of the ambient gas in the vacuum chamber 1.

When the semiconductor exposing apparatus in this embodiment is stopped for maintenance or the like, several steps are taken before the apparatus is stopped. First, the control valve 25 of the constant flow rate supply line 14 is closed in order to stop supplying the very pure ambient gas to the vacuum chamber 1. Also, the valve 82 of the recirculatory supply line 12 and the valve 85 of the high pressure gas supply line 82 are closed. Then, the gas present in the lines 12 and 13, on the downstream sides of the valves 82 and 85, respectively, and the ambience gas in the vacuum chamber 1, are suctioned into the vacuum pump 20, and then are compressed so that the gas pressure increases to 6 kgf/cm$^2$ by the compressor 61, being forced to flow into the high pressure tank 62. After virtually all the gas from the lines 12 and 13, and the vacuum chamber 1, is compressed into the high pressure tank 62, the valve 84 is closed, and the compressor 61 is stopped. Through this process, most of the ambient gas for the vacuum chamber 1 is stored in the high pressure tank 62, in which the pressure of the ambient gas for the vacuum chamber 1 is 6 kgf/cm$^2$. Next, the valve 81 is opened to open the vacuum pump 20 to the atmosphere, and the gas remaining in the vacuum chamber 1, tank 26, and the like, is discharged into the atmosphere by the vacuum pump 20 until virtually all the gas in the vacuum chamber 1, tank 26, and the like is exhausted from them, and then, the valve 81 is closed. Lastly, nitrogen gas having the same pressure as the atmosphere, or the atmospheric air, is introduced into the recirculatory supply line 12 through the pipe 83, consequently into the vacuum chamber 1, tank 26, exhaust gas line 11, and a part of the high pressure gas supply line 13, ending the preparation for stopping the apparatus. Next, the apparatus is stopped for carrying out necessary maintenance and the like operations.

With the above arrangement, the ambient gas for the vacuum chamber 1, such as helium gas which is rather expensive, is almost entirely stored in the high pressure tank 62 so that it can be reused. In other words, the gas is not discharged into the atmosphere as it had been in the case of the prior processing apparatus. Therefore, the consumption of the ambient gas for the vacuum chamber 1, such as helium gas which is expensive, is greatly reduced. Consequently, the cost for running the processing apparatus is greatly reduced.

Figure 10:
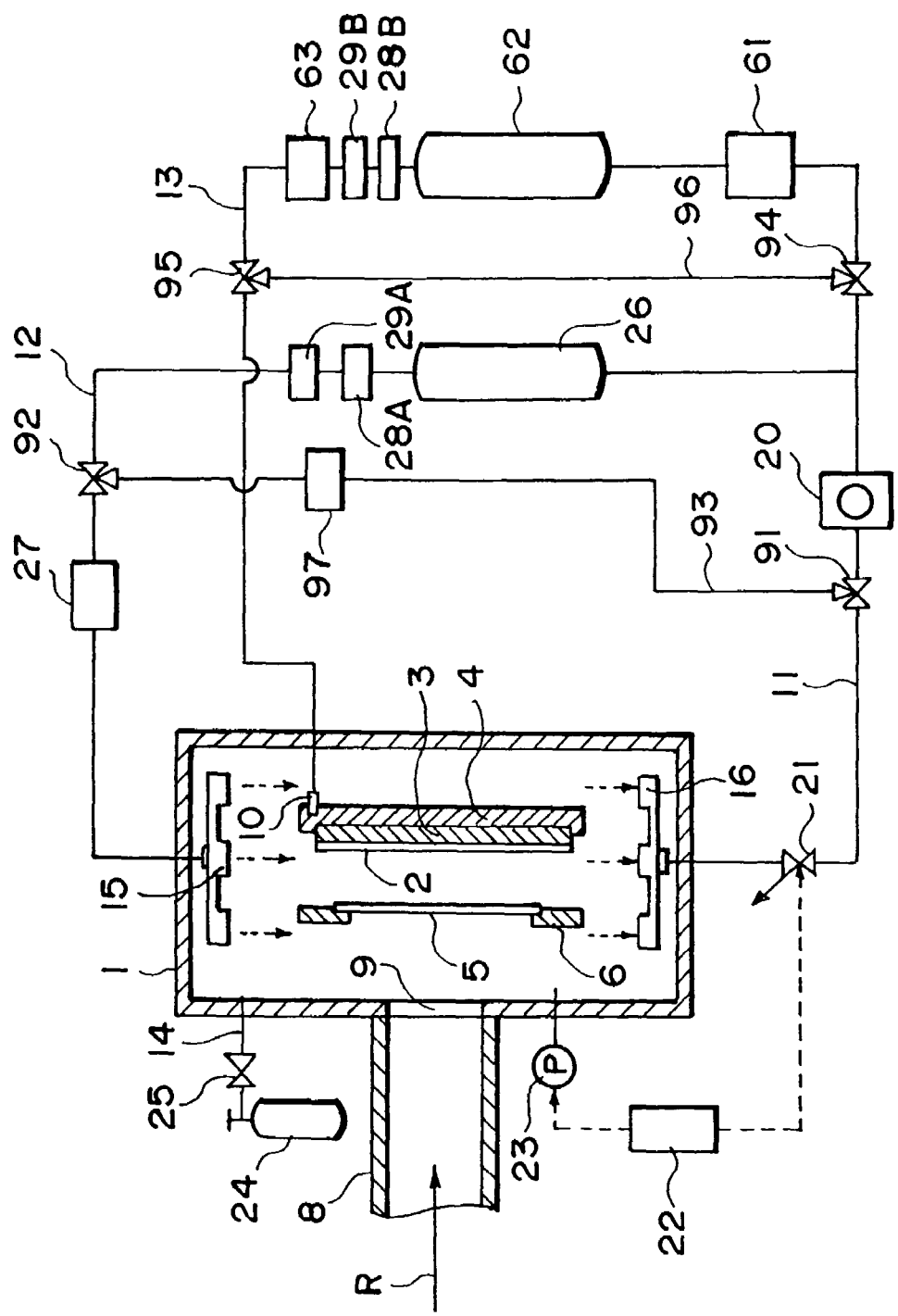
FIG. 10 is a schematic view of another embodiment of the present invention in the form of a processing apparatus, that is, an exposing apparatus.

Next, referring to FIG. 10, another embodiment of the processing apparatus in accordance with the present invention will be described. The components in this embodiment identical to those in the embodiment illustrated in FIG. 9 are given referential characters identical to those in the FIG. 9, and their detailed description will be omitted here.

In this embodiment, the recirculatory system is provided with a first bypass line 93 and a second bypass line 96, in addition to an exhaust gas line 11, a recirculatory supply line 12, and a high pressure gas supply line 13. The first bypass line 93 is an auxiliary line which is connected to the exhaust gas line 11 and the recirculatory supply line 12. The second bypass line 96 is an auxiliary line which is connected to the upstream end portion of the high pressure gas supply line 13 and another point of the high pressure gas supply line 13, that is, a point on the downstream side of a regulator 63. This embodiment is different from the embodiment illustrated in FIG. 9 in that, when the processing apparatus is not in operation, the ambient gas for the vacuum chamber 1 is stored in the recirculatory system which comprises these bypass lines 93 and 96.

The exhaust gas line 11 through which the ambient gas in the vacuum chamber 1 is exhausted to control the internal pressure of the vacuum chamber 1 is provided with a vacuum pump 20 such as a dry pump, a flow rate control valve 21, a controller 22, a pressure sensor 23, and a first three way valve 91. The vacuum pump 20 suctions out the ambient gas in the vacuum chamber 1 through an exhaust orifice 16 located in the bottom portion of the vacuum chamber 1. The flow rate control valve 21 is a valve, the opening angle of which is adjustable. The pressure sensor 23 detects the internal pressure of the vacuum chamber 1. The first three way valve 91 is disposed on the upstream side of the vacuum pump 20. In operation, the opening angle of the flow rate control valve 21 is adjusted by the controller 22 in response to the output of the pressure sensor 23, so that the internal pressure of the vacuum chamber 1 is controlled.

The recirculatory supply line 12, through which the ambience gas for the vacuum chamber 1 exhausted from the vacuum chamber 1 is recirculated into the vacuum chamber 1, is provided with a tank 26, a flow rate control portion 27, a temperature control unit 28A, a chemical filter 29A, and a second three way valve 92, and is connected to an intake orifice 15. The tank 26 stores the gas exhausted from the vacuum chamber 1 by the vacuum pump 20 of the exhaust gas line 11, and compressed by the vacuum pump 20. It suppresses the pressure fluctuation caused by the pulsation or the like of the vacuum pump 20, and also function as a buffer so that even if the flow rate at which the gas flows into the tank 26 decreases, the flow rate at which the gas is sent into the vacuum chamber 1 remains at a predetermined level. The flow rate control portion 27 is constituted of a mass flow controller or a conductance valve, or the like, and controls the flow rate at which the ambient gas suctioned out of the vacuum chamber 1 is recirculated into the vacuum chamber 1 through the intake orifice 15, after its temperature is adjusted to a predetermined level by the temperature control unit 28A.

The high pressure gas supply line 13, which compresses the ambient gas exhausted from the vacuum chamber 1, and supplies this compressed ambient gas to a plurality of static pressure bearings 10 in the vacuum chamber 1, is provided with a compressor 61, a high pressure tank 62, a regulator 63, a temperature control unit 28B, a chemical filter 29B, a third three way valve 94, and a fourth three way valve 95. The compressor 61 further compresses the gas exhausted by the vacuum pump 20 so that the gas pressure increases to a predetermined level. The high pressure tank 62 stores the gas compressed by the compressor 61. The regulator 63 allows the compressed gas from the high pressure tank 62 to slightly decompress, and supplies this slightly decompressed gas to the static pressure bearings 10 of the positioning stage and the like at a predetermined constant flow rate. The third three way valves 94 is disposed on the upstream side of the compressor 61, and the fourth three way valve 95 is disposed on the downstream side of the regulator 63. The first bypass line 92 connects the first and second three way valves 91 and 92, and the second bypass line 96 connects the third and fourth three way valves 94 and 95. The constant flow rate supply line 14 is provided with a gas cylinder 24 filled with highly pure ambience gas for the vacuum chamber 1, and a flow rate control valve 25. It is structured to supply the vacuum chamber 1 with the ambient gas for the vacuum chamber 1 at a predetermined constant flow rate (for example, 0.8 SLM) to counter the air leak into the vacuum chamber 1 caused by the vacuum of the vacuum chamber 1.

When the first to fourth three way valves 91, 92, 93 and 94 are kept closed to prevent the ambient gas from flowing through the first and second bypass lines 93 and 96, the recirculatory system in this embodiment structured as described above to control the internal environment of the vacuum chamber 1 functions in the same manner as the recirculatory system in the above described embodiment illustrated in FIG. 9. In other words, the ambient gas in the vacuum chamber 1 is suctioned out through the exhaust gas line 11, and recirculated into the vacuum chamber 1 through the recirculatory supply line 12, so that the ambient gas in the vacuum chamber 1 is caused to flow downward while maintaining the internal pressure of the vacuum chamber 1 at a predetermined vacuum level. Also, the ambient gas in the vacuum chamber 1 suctioned out by the vacuum pump 20 is recirculated through the high pressure gas supply line 13, which compresses the gas and supplies the compressed gas to the static pressure bearings 10.

When the apparatus is stopped for maintenance or the like operations, the following procedure is carried out prior to the stopping of the apparatus. First, the control vale 26 of the constant flow rate supply line 14 is closed to stop supplying the highly pure ambience gas for the vacuum chamber 1. Then, the second and fourth three way valves 92 and 95 are turned to the positions for the maintenance or the like operations. Then, the ambient gas in the vacuum chamber 1, the gas in the recirculatory supply line 12, on the downstream side of the second three way valve 92, and the gas in the high pressure gas supply line 13, on the downstream side of the fourth three way valve 95, are suctioned out by the vacuum pump 20, and compressed into the tank 26 and the high pressure tank 62. After the gases are compressed into the tank 26 and the high pressure tank 62, the first and third three valves 91 and 94 are turned to the positions for the maintenance or the like operation, creating a first path and a second path. The first path runs from the vacuum pump 20 of the exhaust gas line 11, and returns to the vacuum pump 20, through the tank 26 of the recirculatory supply line 12, the second three way valve 92, the first bypass line 93, a pressure loss portion 97, and the first three way valve 91, in this order. The second path runs from the compressor 61 of the high pressure gas supply line 13, and returns to the compressor 61, through the high pressure tank 62, the regulator 63, the fourth three way valve 95, the second bypass line 96, and the third three way valve 94, in this order. In this state, the compressor 61 operates until the internal pressure of the high pressure tank 62 reaches 6 kgf/cm$^2$, stopping as the pressure reaches 6 kgf/cm$^2$, and begins operating as the pressure decreases below 6 kgf/cm$^2$, operating until the pressure reaches 6 kgf/cm$^2$. Thus, the ambient gas for the vacuum chamber 1, such as helium gas, which is rather expensive, is almost entirely stored in the first path comprising the first bypass line 93 and the tank 26, and the second path comprising the second bypass line 96 and the high pressure tank 62. In other words, unlike in the case of the processing apparatus prior to the present invention, it does not occur that the ambient gas for the vacuum chamber 1 is entirely discharged into the atmosphere. Also in this embodiment, the vacuum pump 20 and the compressor 61 can be kept in the operating state while the processing apparatus is not in operation. Therefore, the ambient gas for the vacuum chamber 1 stored in the first and second paths can be immediately reused as the apparatus is restarted. Thus, according to this embodiment, the consumption of the ambient gas for the vacuum chamber 1, such as helium gas, which is rather expensive, can be greatly reduced, which in turn greatly can greatly reduce the cost for running the apparatus.

Figure 11:
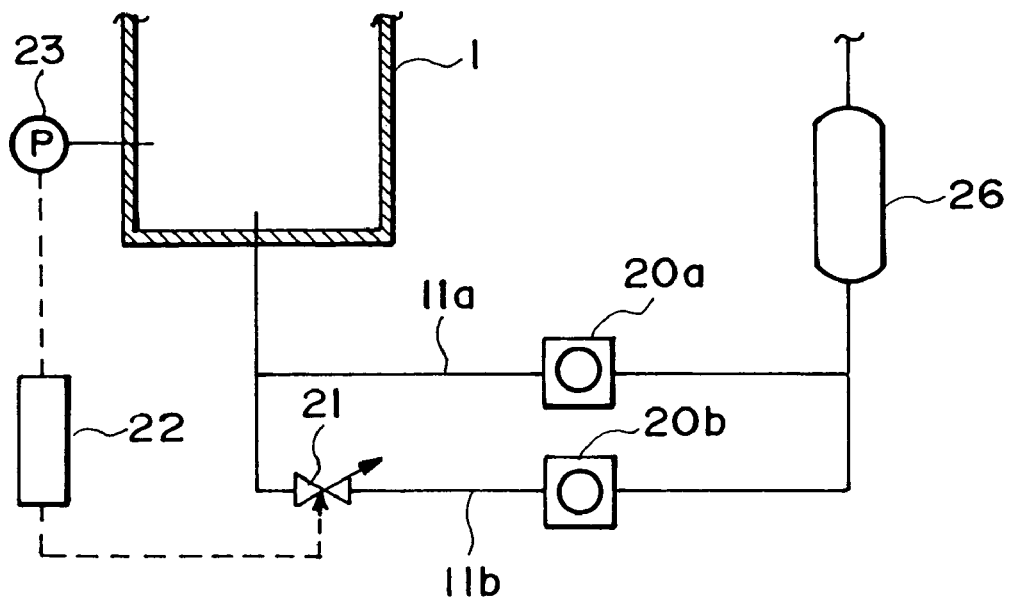
FIGS. 11, (a) and (b), are schematic views of the exhaust line portions of two different embodiments of the present invention in the form of a processing apparatus.
Figure 11:
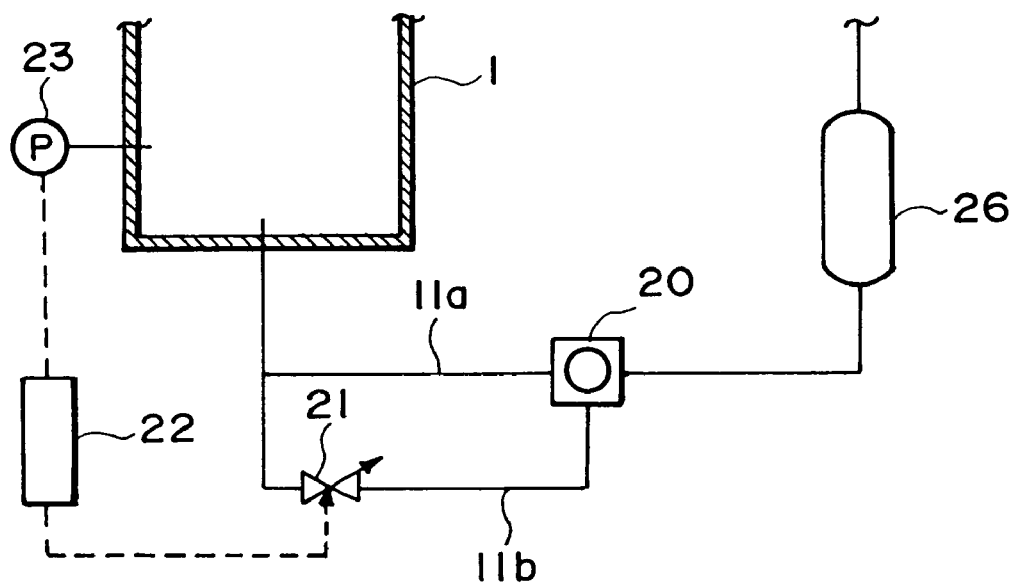

Next, referring to FIGS. 11, (a) and (b), another embodiment of the processing apparatus in accordance with the present invention will be described. FIGS. 11, (a) and (b), are schematic views of the exhaust gas line of the processing apparatus in accordance with the present invention, and its modification, respectively.

In each of the preceding embodiments of the present invention, the exhaust gas line, through which the ambient gas in the vacuum chamber, such as helium gas, is exhausted to control the internal pressure of the vacuum chamber, comprises: a vacuum pump or compressor for sectioning out the ambient gas in the vacuum chamber 1; a flow rate control valve, the opening angle of which is adjustable; a pressure sensor for detecting the internal pressure of the vacuum chamber; and a controller. In this embodiment, however, the vacuum pump and the exhaust gas line are disposed as illustrated in FIGS. 11, (a) and (b), to improve the pressure control accuracy so that the internal pressure of the vacuum chamber is more precisely maintained at a predetermined level.

In FIG. 11, (a), an exhaust gas line 11, which is connected to a tank 26, and through which the ambient gas in the vacuum chamber 1, that is, helium gas or the like, is suctioned out to control the internal pressure of the vacuum chamber 1, is branched into first and second exhaust gas lines 11a and 11b, which are provided with vacuum pumps 20a and 20b, respectively. The conductances of the exhaust gas lines 11a and 11b are preset. In the embodiment illustrated in FIG. 11, (a), the conductances are preset so that the flow rate at which the gas flows through the exhaust gas line 11b is smaller than the flow rate at which the gas flows through the exhaust line 11b. For example, the conductances are preset so that when the gas flows through the exhaust gas line 11a at a flow rate of 300 SLM, the gas flows through the exhaust gas line 11b at approximately 10 SLM. The flow rate control valve 21, the opening angle of which is adjusted by the controller 22 in response to the internal pressure of the vacuum chamber 1 detected by the pressure sensor 23, is connected into the exhaust gas line 11b with the smaller flow rate.

With the exhaust gas line 11 being structured as described above, the ambient gas, that is, helium gas or the like, in the vacuum chamber 1 is suctioned out through both the exhaust gas lines 11a and 11b. The flow rate at which the gas is suctioned out of the vacuum chamber 1 is adjusted with the use of the flow rate control valve 21 of the exhaust gas line 11b, which is controlled by the controller 22 in response to the internal pressure of the vacuum chamber 1 detected by the pressure sensor 23, so that the internal pressure of the vacuum chamber 1 is kept at a predetermined vacuum level. On the other hand, the flow rate at which the gas is suctioned through the exhaust gas line 11a is kept substantially constant. In other words, the internal pressure of the vacuum chamber 1 is adjusted by adjusting the flow rate at which the gas is suctioned through the exhaust gas line 11b, and therefore, the flow rate at which the gas is suctioned out of the vacuum chamber 1 can be more accurately controlled with the use of the flow rate control valve 21.

In the system illustrated in FIG. 11, (a), the exhaust lines 11a and 11b are provided with vacuum pumps 20a and 20b, respectively. However, the two exhaust gas lines 11a and 11b may be connected to a single vacuum pump 20 as illustrated in FIG. 11, (b). Also in this case, the flow rate control valve 21 is connected to the exhaust gas line 11b with a smaller flow rate. Therefore, the flow rate at which the gas is suctioned out of the vacuum chamber 1 is controlled at a more precise level with the use of the flow rate control valve 21.

In other words, in the embodiments illustrated in FIGS. 11, (a) and (b), a portion of the exhaust gas line, through which the ambient gas, that is, helium gas or the like, in the vacuum chamber 1 is suctioned out, is branched into two lines, and a pressure control means constituted of a flow rate control valve is connected to the line with a smaller flow rate. Therefore, the flow rate at which the gas is suctioned out of the vacuum chamber 1 is controlled at a more precise level with the use of the flow rate control valve connected to the line with the smaller flow rate, which in turn keeps the internal pressure of the vacuum chamber 1 constant at a more precise level.

Next, an embodiment of a device manufacturing method which employs the above described processing apparatus in accordance with the present invention will be described.

FIG. 12 depicts the flow of the manufacture of a microscopic device (semiconductor chip such as IC or LSI, liquid crystal panel, CCD, thin film magnetic head, and like microscopic machine). In Step 1 (circuit designing), a device pattern is designed. In Step 2 (mask manufacturing), a mask which has the designed device pattern is manufactured. Meanwhile, in Step 3 (wafer manufacturing), wafer is manufactured from silicon, glass, or the like material. Step 4

(wafer processing) is called the pre-processing step, in which an actual circuit is formed on a piece of the wafer manufactured in Step 4, using lithographic technologies. Step 5 (assembling) is called the post-processing step, in which a semiconductor device is assembled using the wafers manufactured in Step 4. It includes an assembling process (dicing, bonding), a packaging process (chip sealing), and the like. In Step 6 (inspection), tests are carried out to confirm the performance, durability, and the like, of the semiconductor chip assembled in Step 5. Then, the semiconductor device completed through the above processes is shipped (Step 7).

Figure 13:
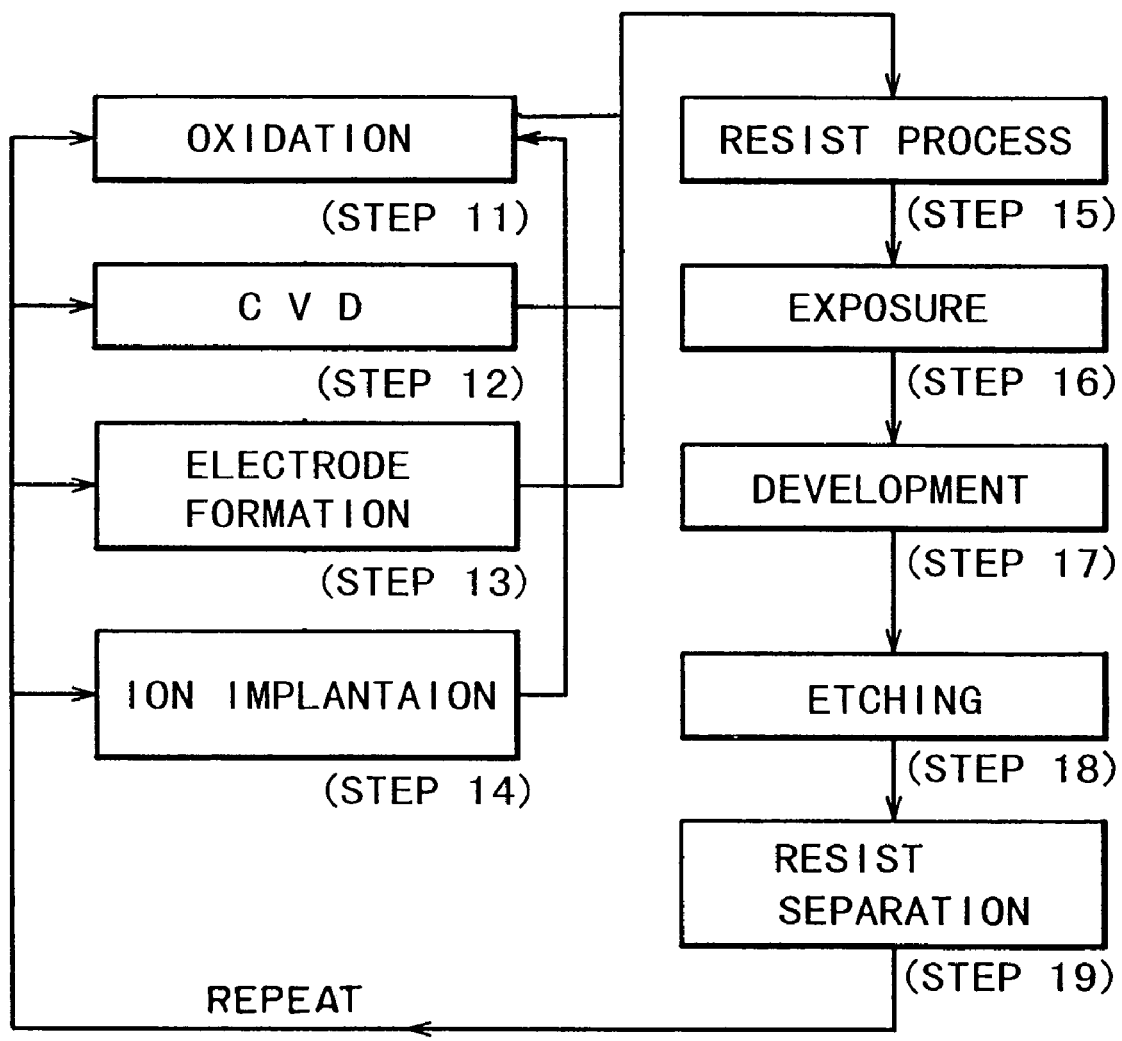
FIG. 13 is a flow chart for a wafer process.

FIG. 13 depicts the detail of the aforementioned wafer process. In Step 11 (oxidization), the surface of the wafer is oxidized. In Step 12 (CVD), electrically insulative thin film is formed across the wafer surface. In Step 13 (electrode formation), electrodes are formed on the wafer by vapor deposition. In Step 14 (ion implantation), ions are implanted in the wafer. In Step 15 (resist processing), resist is coated on the wafer. In Step 16 (exposure), the circuit pattern, or the mask pattern, is transferred onto each of a plurality of precisely aligned and designated sections of the wafer surface. In Step 7 (development), the exposed wafer is developed. In Step 8 (etching), the developed wafer is etched except for the portions covered with the resist. In Step 19 (resist removed), the resist, which is no longer useful after the etching of the wafer, is removed. These steps are repeated to form multiple layers of circuit patterns.

With the use of the above described device manufacturing method, a highly integrated device, which was difficult to manufacture in the past, can be economically manufactured.

As described above, according to the main aspect of the present invention, a processing apparatus is provided with a gas recirculating system, which suctions out the ambient gas in the vacuum chamber, and recirculates it into the vacuum chamber, to create gas flow in a predetermined direction in the vacuum chamber of the processing apparatus, along the processing portion, so that the heat generated by the heat source in the vacuum chamber is sufficiently removed, or dissipated, to prevent the internal temperature of the vacuum chamber from becoming locally uneven. Therefore, the ambient gas in the vacuum chamber does not become turbulent. In other words, the state of the ambient gas in the vacuum chamber remains stable.

According to another aspect of the present invention, a processing apparatus is provided with a vacuum pump as a means for moving the ambient gas for the vacuum chamber through the gas recirculating system. This eliminates vibration such as is caused by the blower of a conventional air container, reducing the overall amount of the vibration, improving therefore the apparatus in terms of resolution. Further, the employment of a vacuum pump saves space, which reduces the apparatus cost.

According to another aspect of the present invention, the ambient gas recirculating system in a processing apparatus is provided with ordinary filters or chemical filters. This makes it possible to efficiently remove the particles in the ambient gas, or substances produced through chemical reaction triggered among the elements in the ambience gas by exposure light. Therefore, exposure energy is prevented from attenuating. In other words, the present invention prevents exposure energy from attenuating, preventing therefore the throughput of the apparatus from reducing, as well as preventing uneven exposure.

Further, the ambient gas can be blown into local areas such as the location of the measurement light path of the interferometry measuring device, while keeping constant the temperature of the gas to be blown. This reduces the amount of measurement error of the interferometry measuring device, improving therefore the alignment accuracy.

Further, according to another aspect of the present invention, the gas from the source other than the primary gas recirculating system, that is, the gas from the gas supply source, the gas from the high pressure tank connected to the high pressure gas recirculating system, and the gas from the vacuum pump for operating the suction chuck, are stored in the tank connected into the primary gas recirculating system for recirculating the ambient gas exhausted from the vacuum chamber. Therefore, the pressure decrease which occurs to the internal ambience of the vacuum chamber or the gas recirculating system is effectively compensated for, improving the accuracy with which the internal pressure of the vacuum chamber is controlled.

Further, according to another embodiment of the processing apparatus in accordance with the present invention, when the apparatus is not in operation, the ambient gas in the sealed low pressure chamber is stored in the ambient gas recirculating system which comprises tanks and bypass lines, greatly reducing the consumption of the ambient gas, such as helium gas, which is rather expensive. Therefore, it costs less to run the apparatus.

Application of the present invention to a semiconductor exposing apparatus makes it possible to more precisely control the pressure of the ambient gas in a vacuum chamber as an exposing chamber, preventing exposing light such as X-ray from attenuating, preventing uneven exposure, preventing a mask or a substrate from being inaccuracy positioned due to heat, reducing the amount of measurement error, and improving positioning accuracy and alignment accuracy. Therefore, very precise exposure is possible. In addition, application of the present invention to a measuring apparatus makes it possible to very precisely measure an object, without measurement error.

While the invention has been described with reference to the structures disclosed herein, it is not confined to the details set forth and this application is intended to cover such modifications or changes as may come within the purposes of the improvements or the scope of the following claims.

What is claimed is:

1. A processing apparatus comprising:
   a chamber accommodating a processing portion;
   an exhaust gas line, connected to said chamber, for exhausting ambient gas in said chamber;
   a vacuum pump, connected to said exhaust gas line, for compressing the ambient gas;
   a supply line for supplying the compressed ambient gas into said chamber;
   a high pressure gas supply line branched out of said supply line; and
   a compressor, provided in said high pressure gas supply line, for further compressing the ambient gas compressed by said vacuum pump.

2. The apparatus according to claim 1, further comprising a stage provided in said chamber, and a hydrostatic bearing for movably guiding said stage, wherein said high pressure gas supply line supplies the ambient gas to said hydrostatic bearing.

3. The apparatus according to claim 1, further comprising a pressure sensor for detecting a pressure in said chamber, and a controller for controlling a pressure in said chamber on the basis of an output of said pressure sensor.

4. An exposure apparatus comprising a processing apparatus as defined in claim 1, a stage for positioning a substrate to be exposed in said processing apparatus, and a laser interferometer for detecting a position of said stage.

5. A device manufacturing method comprising a step of applying a photosensitive material on a substrate, and a step of exposing a substrate by the apparatus as defined in claim 4, and a step of developing the substrate thus exposed.

* * * * *

UNITED STATES PATENT AND TRADEMARK OFFICE
CERTIFICATE OF CORRECTION

PATENT NO. : 6,984,362 B2
APPLICATION NO. : 10/619506
DATED : January 10, 2006
INVENTOR(S) : Shinichi Hara et al.

It is certified that error appears in the above-identified patent and that said Letters Patent is hereby corrected as shown below:

IN THE DRAWINGS
FIG. 13, "IMPLANTAION" should read --IMPLANTATION--.

COLUMN 1
Line 49, "attects" should read --affects--.

COLUMN 2
Line 58, "net" should read --not--.

COLUMN 7
Line 32, "blow" should read --blown--;
Line 38, "blow" should read --blown--; and
Line 48, "the," should read --the--.

COLUMN 8
Line 9, "object" should read --objects--; and
Line 61, "object" should read --objects--.

COLUMN 11
Line 16, "object" should read --objects--; and
Line 34, "object," should read --objects,--.

COLUMN 12
Line 44, "compensate" should read --compensated--.

COLUMN 17
Line 21, "flucture," should read --fluctuate,--; and
Line 28, "embodiment" should read --embodiment of--.

COLUMN 18
Line 38, "measure" should read --measured--.

COLUMN 19
Line 55, "measure" should read --measured--.

COLUMN 24
Line 47, "structure" should read --structured--; and
Line 55, "1.0 kg Vcm$^2$." should read --1.0 kgf/cm$^2$.--.

UNITED STATES PATENT AND TRADEMARK OFFICE
CERTIFICATE OF CORRECTION

PATENT NO. : 6,984,362 B2
APPLICATION NO. : 10/619506
DATED : January 10, 2006
INVENTOR(S) : Shinichi Hara et al.

It is certified that error appears in the above-identified patent and that said Letters Patent is hereby corrected as shown below:

COLUMN 27
Line 7, "recirculated" should read --recirculate--; and
Line 37, "keep" should read --kept--.

COLUMN 30
Line 4, "function" should read --functions--;
Line 30, "valves 94" should read --valve 94--; and
Line 63, "vale 26" should read --valve 25--.

COLUMN 34
Line 31, "inaccuracy" should read --inaccurately--.

COLUMN 36
Line 2, "and" should be deleted.

Signed and Sealed this

Tenth Day of October, 2006

JON W. DUDAS
*Director of the United States Patent and Trademark Office*